United States Patent
Teng et al.

(10) Patent No.: US 12,452,404 B2
(45) Date of Patent: Oct. 21, 2025

(54) METHOD FOR DETERMINING SPECIFIC LINEAR MODEL AND VIDEO PROCESSING DEVICE

(71) Applicant: SHARP KABUSHIKI KAISHA, Sakai (JP)

(72) Inventors: Chih-Yu Teng, Taipei (TW); Chih-Yuan Chen, Taipei (TW); Yu-Chiao Yang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 162 days.

(21) Appl. No.: 18/299,709

(22) Filed: Apr. 12, 2023

(65) Prior Publication Data

US 2023/0336711 A1    Oct. 19, 2023

Related U.S. Application Data

(60) Provisional application No. 63/331,137, filed on Apr. 14, 2022.

(51) Int. Cl.
| | |
|---|---|
| *H04N 19/103* | (2014.01) |
| *H04N 19/132* | (2014.01) |
| *H04N 19/176* | (2014.01) |
| *H04N 19/186* | (2014.01) |
| *H04N 19/46* | (2014.01) |

(52) U.S. Cl.
CPC ......... *H04N 19/103* (2014.11); *H04N 19/132* (2014.11); *H04N 19/176* (2014.11); *H04N 19/186* (2014.11); *H04N 19/46* (2014.11)

(58) Field of Classification Search
None
See application file for complete search history.

(56) References Cited

U.S. PATENT DOCUMENTS

2021/0385440 A1* 12/2021 Filippov ............... H04N 19/117
2023/0328255 A1* 10/2023 Wang .................... H04N 19/146

FOREIGN PATENT DOCUMENTS

| WO | 2020035837 | 2/2020 |
|---|---|---|
| WO | 2020069667 | 4/2020 |

OTHER PUBLICATIONS

"Search Report of Europe Counterpart Application", issued on Jun. 19, 2023, p. 1-p. 10.

* cited by examiner

*Primary Examiner* — Mikhail Itskovich
(74) *Attorney, Agent, or Firm* — ScienBiziP, P.C.

(57) ABSTRACT

Embodiments of the disclosure provide a method for determining a specific linear model and a video processing device. The method includes: determining a plurality of linear model parameters of each of a plurality of linear models; determining a chroma template reconstruction and a luma template, wherein the chroma template reconstruction and the luma template are associated with a specific chroma block; determining a chroma template prediction corresponding to each of the plurality of linear models based on the luma template and the corresponding linear model parameters; determining a template cost of each of the plurality of linear models based on the chroma template reconstruction and the corresponding chroma template prediction; and selecting the specific linear model from the linear models based on the template cost of each of the plurality of linear models.

19 Claims, 16 Drawing Sheets

METHOD FOR DETERMINING SPECIFIC LINEAR MODEL AND VIDEO PROCESSING DEVICE

CROSS-REFERENCE TO RELATED APPLICATION

This application claims the priority benefit of U.S. provisional application Ser. No. 63/331,137, filed on Apr. 14, 2022. The entirety of the above-mentioned patent application is hereby incorporated by reference herein and made a part of this specification.

BACKGROUND

1. Field of the Invention

The present disclosure generally relates to a video processing mechanism, in particular, to a method for determining a specific linear model and a video processing device.

2. Description of Related Art

In Versatile video coding (VVC), the intra prediction mode of chroma component may be selected from a chroma candidate list. The chroma candidate list may include a plurality of conventional intra prediction modes and a plurality of cross component linear model (CCLM) prediction modes. The conventional intra prediction modes in the chroma candidate list may include a plurality of non-angular modes and a plurality of angular modes.

In some implementations, the non-angular mode may be one of Planar mode, DC mode and Derived mode (DM). The angular mode may be one of 65 directional intra modes. Since the numerous of conventional intra prediction modes, signaling the index of the chroma candidate list may be less than signaling the index of the conventional intra prediction modes.

CCLM is an intra prediction tool for the chroma component in VVC. The CCLM prediction uses a correlation between luma component and chroma component to predict chroma component. Based on various video format (4:4:4, 4:2:2, 4:2:0), the luma component may need to be downsampled for prediction. The chroma samples is predicted by downsampled reconstructed luma samples as the equation "$pred_C(i, j) = \alpha \cdot rec_L'(i, j) + \beta$".

See FIG. 1, which shows a schematic diagram of the derivation of CCLM. In FIG. 1, $rec_L$ is the reconstructed luma block, $rec_L'$ is the downsampled reconstructed luma block and $pred_C$ is the prediction of the chroma block. The chroma block is predicted from the corresponding downsampled reconstructed luma block, $rec_L'$, based on a linear model.

The linear model is constructed based on the downsampled reconstructed luma reference samples, RL', and the chroma reference samples, RC. $\alpha$ and $\beta$ are parameters of the linear model and the linear model parameters are derived from the downsampled reconstructed luma reference samples and the chroma reference samples, as shown in FIG. 2, which shows a schematic diagram of the CCLM.

In FIG. 2, RL'(i, j) represents the value of the downsampled reconstructed luma reference samples and RC(i, j) represents the value of the chroma reference samples. In some implementations, the CCLM prediction modes may include a plurality of Multi-Direction Linear Model (MDLM) prediction modes and a plurality of Multi-Model Linear Model (MMLM) prediction modes.

Each of the plurality of MDLM prediction mode has a linear model to predict the chroma block based on the corresponding downsampled reconstructed luma block. In some implementations, the plurality of MDLM prediction modes include: MDLM_LM mode, MDLM_T mode and MDLM_L mode.

The difference between the plurality of MDLM prediction modes are the reference sample regions and the reference sample regions are used to derive the parameters of the linear models, as shown in FIGS. 3A to 3C, which show the reference sample regions neighbouring the chroma block and the corresponding downsampled reconstructed luma block.

As shown in FIG. 3A, the reference sample regions of the MDLM_LM mode include the above reference sample region and the left reference sample region. In some implementations, the number of reference samples in above reference sample region may be equal to the chroma block width and the number of the reference samples in the left reference sample region may be equal to the chroma block height.

As shown in FIG. 3B, the reference sample regions of the MDLM_T mode include the above reference sample region and the above-right reference sample region. The number of the reference samples in the above reference samples may be equal to the chroma block width. In some implementations, the number of the reference samples in the above-right reference samples may be equal to the chroma block height.

As shown in FIG. 3C, the reference sample region of the MDLM_L mode include the left reference sample region and the bottom-left reference sample region. The number of the reference samples in the left reference sample region may be equal to the chroma block height. In some implementations, the number of the reference samples in the bottom-left reference sample region may be equal to the chroma block width.

The parameters of the linear model in each MDLM prediction mode are derived based on a plurality of reference samples in the reference sample regions. In some implementations, the plurality of reference samples may be selected from top reference sample region and left reference sample region. The plurality of reference samples may be selected by a starting parameter of top reference sample region, $StartingPosition_T$, a starting parameter of left reference sample region, $StartingPosition_L$, a interval parameter of top reference sample region, $IntervalStep_T$ and an interval parameter of left reference sample region, $IntervalStep_L$. In some implementations, the start parameters and interval parameters may be derived based on the number of reference samples. The starting parameter and interval parameter of top reference sample region may be derived based the number of top reference samples, $numRefSamp_T$ and the starting parameter and interval parameter of left reference sample region may be derived based on the number of left reference sample region, $numRefSamp_L$.

In some implementations, the $StartingPosition_T$ may be represented by $numRefSamp_T >> N$ and the $StartingPosition_L$ may be represented by $numRefSamp_L >> N$, which N may be an integer number.

In some implementations, the $StartingPosition_T$ may be represented by $numRefSamp_T * a_f$ and the $StartingPosition_L$ may be represented by $numRefSamp_L * a_f$, which $a_f$ may be a fractional number.

In some implementations, the $StartingPosition_T$ may be represented by $numRefSamp_T * a_f + b$ and the $StartingPosition_L$ may be represented by $numRefSamp_T * a_f + b$, which $a_f$ may be a fractional number and b may be an integer number.

In some implementations, the StartingPosition$_T$ may be represented by (numRefSamp$_T$>>N)+k, which N and k may be an integer number, and the StartingPosition$_L$ may be represented by (numRefSamp$_L$>>N)+k, which N and k may be an integer number.

In the disclosure, the operator "x>>y" means to perform an Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

On the other hand, the operator "x<<y" means to perform an Arithmetic left shift of a two's complement integer representation of x by y binary digits. This function is defined only for non-negative integer values of y. Bits shifted into the least significant bits (LSBs) as a result of the left shift have a value equal to 0.

In some implementations, the integer number k may be represented by (numRefSamp$_T$>>N)<<i and (numRefSamp$_L$>>N)<<i, which i may be an integer number. For an example, if numRefSamp$_T$=16, N=3, i=1, then the StartingPosition$_T$ is (16>>3)+((16>>3)<<1)=6.

In some implementations, the IntervalStep$_T$ may be represented by numRefSamp$_T$>>N, which N may be an integer number and the IntervalStep$_L$ may be represented by numRefSamp$_L$>>N, which N may be a integer number. For example, if numRefSamp$_T$=16, N=1, then the interval parameter is 16>>1=8.

In some implementations, the IntervalStep$_T$ may be represented by numRefSamp$_T$*a$_f$, which a$_f$ may be a fractional number, and the IntervalStep$_L$ may be represented by numRefSamp$_L$*a$_f$, which a$_f$ may be a fractional number.

In some implementations, the IntervalStep$_T$ may be represented by numRefSamp$_T$*a$_f$+b, which a$_f$ may be a fractional number and b may be an integer number, and the IntervalStep$_L$ may be represented by numRefSamp$_T$*a$_f$+b, which a$_f$ may be a fractional number and b may be an integer number.

In some implementations, the IntervalStep$_T$ may be represented by (numRefSamp$_T$>>N)+k, which N and k may be an integer number, and the IntervalStep$_L$ may be represented by (numRefSamp$_L$>>N)+k, which N and k may be an integer number. In some implementations, the integer number k may be represented by (numRefSamp$_T$>>N)<<i and (numRefSamp$_L$>>N)<<i, which i may be an integer number.

The parameters of the linear model in each MDLM prediction mode are derived based on the four selected reference samples in the chroma reference samples and four selected reference samples in the downsampled reconstructed luma reference samples. The four selected reference samples in the chroma reference samples may be used to derive C_MIN$_{avg}$ and C_MAX$_{avg}$ and the four selected reference samples in the downsampled luma reference samples may be used to derive Y_MIN$_{avg}$, Y_MAX$_{avg}$.

The parameters of linear model in each MDLM prediction mode (α and β) may be derived based on Y_MIN$_{avg}$, Y_MAX$_{avg}$, C_MIN$_{avg}$ and C_MAX$_{avg}$ as follow:

$$\alpha = \frac{C\_MAX_{avg} - C\_MIN_{avg}}{Y\_MAX_{avg} - Y\_MIN_{avg}}$$

$$\beta = C\_MIN_{avg} - \alpha \times Y\_MIN_{avg}$$

The Y_MIN$_{avg}$ may be derived by average two smaller samples of four selected reference samples in the downsampled luma reference samples, the Y_MAX$_{avg}$ may be derived by average two larger samples of four selected reference samples in the downsampled luma samples. The C_MIN$_{avg}$ may be derived by average two smaller samples of four selected reference samples in the chroma reference samples, the C_MAX$_{avg}$ may be derived by average two larger samples of four selected reference samples in the chroma reference samples, as shown in FIG. 4, which shows a schematic diagram of the MDLM.

In some implementations, the parameters of linear model in each MDLM prediction mode may be derived based on all of reference samples in the reference sample regions by the Least mean square (LMS) algorithm.

Each of the plurality of MMLM prediction mode has more than one linear model to predict the chroma block based on the corresponding downsampled reconstructed luma block. In some implementations, the number of linear models in the MMLM prediction mode may be equal to two. The plurality of MMLM prediction modes include: MMLM_LM mode, MMLM_T mode and MMLM_L mode. The difference between the plurality of MMLM prediction modes are the reference sample regions and the reference sample regions are used to derive the parameters of the linear models, as shown in FIG. 3. The difference between the MDLM prediction modes and the MMLM prediction modes is the number of linear models in each mode as shown in FIG. 5.

See FIG. 5, which shows a schematic diagram of the MMLM. In FIG. 5, the reference samples may be categorized into two groups in MMLM prediction mode and the parameters of two linear model may be derived by the reference samples in each group. The reference samples may be categorized into two groups by an average reference sample value, Yang. The average reference sample value may be derived by average the downsampled reconstructed luma reference samples.

The reference samples in the downsampled reconstructed luma reference samples may be categorized into two groups by the average reference sample value Yang. The reference samples in the downsampled reconstructed luma reference samples smaller than the average reference sample value may be categorized as Luma_smaller group and the reference samples larger than the average reference sample value may be categorized as Luma_larger group. The reference samples in chroma reference samples corresponding to the Luma_smaller group may be categorized as Chroma_smaller group and the reference samples in chroma reference samples corresponding to the Luma_larger group may be categorized as Chroma_larger group.

In some implementations, two linear models in each MMLM prediction mode may be derived based on a plurality of reference samples in the larger group and smaller group. In some implementations, one of the linear model in the MMLM prediction mode may be derived based on the plurality of reference samples in the Luma_larger group and Chroma_larger group. The other one of the linear model in the MMLM prediction mode may be derived based on the plurality of reference samples in the Luma_samller group and Chroma_smaller group.

The parameters of the linear model in the larger group may be derived by Y_MAX$_L$, Y_MIN$_L$, C_MAX$_L$ and C_MIN$_L$. Y_MAX$_L$ and Y_MIN$_L$ are the maximum and minimum sample value in the Luma_larger group and C_MAX$_L$ and C_MIN$_L$ are the chroma reference samples corresponding to the Y_MAX$_L$ and Y_MIN$_L$. The parameters of the linear model in the larger group ($\alpha_L$ and $\beta_L$) may be derived as shown in FIG. 5.

The parameters of the linear model in the smaller group may be derived by $Y\_MAX_S$, $Y\_MIN_S$, $C\_MAX_S$ and $C\_MIN_S$. $Y\_MAX_S$ and $Y\_MIN_S$ are the maximum and minimum sample value in the Luma_smaller group and $C\_MAX_S$ and $C\_MIN_S$ are the chroma reference samples corresponding to the $Y\_MAX_S$ and $Y\_MIN_S$. The parameters of the linear model in the smaller group (as and (3s) may be derived as shown in FIG. 5.

In some implementations, two linear models in each MMLM prediction mode may be derived from the reference samples in the large group and smaller group by LMS algorithm.

The intra prediction mode of chroma component may be selected from a chroma candidate list. In some implementations, the chroma candidate list may include Planar mode, Vertical mode, Horizontal mode, DC mode, MDLM_LM mode, MDLM_L mode, MDLM_T mode, MMLM_LM mode, MMLM_L mode, MMLM_T mode and Derived mode. The chroma candidate list may have a redundant check. The redundant check may check whether the derived mode is identical to one of Planar mode, Vertical mode, Horizontal mode and DC mode. If the derived mode is identical to one of Planar mode, Vertical mode, Horizontal mode and DC mode, the identical mode may be replaced with a replaced mode. The replaced mode may be different from each mode in the chroma candidate list. The replaced mode may be a Diagonal mode. In some implementations, the replaced mode may be the prediction mode index 66 in the VVC.

Signaling the intra prediction mode of chroma component may based on three syntax flags: cclm_mode_flag, lm_mode_flag and dm_mode_flag.

cclm_mode_flag specifies the prediction mode is CCLM prediction mode or not. If cclm_mode_flag is equal to 1, the chroma intra prediction mode is CCLM prediction mode. If the cclm_mode_flag is equal to 0, the chroma intra prediction mode is not CCLM prediction mode.

lm_mode_flag specifies the prediction mode is MDLM_LM mode or not. If lm_mode_flag is equal to 1, the chroma intra prediction mode is MDLM_LM mode. If lm_mode_flag is equal to 0, the chroma intra prediction mode is not MDLM_LM mode.

dm_mode_flag specifies the prediction mode is derived mode or not. If dm_mode_flag is equal to 1, the chroma intra prediction mode is derived mode. If dm_mode_flag is equal to 0, the chroma intra prediction mode is not derived mode.

See FIG. 6, which shows the signaling tree of the chroma intra prediction mode. In FIG. 6, If cclm_mode_flag is equal to 0 and dm_mode_flag is equal to 1, then signaling bins in truncated binary to indicate the chroma intra prediction mode in Planar mode, Vertical mode, Horizontal mode and DC mode.

If cclm_mode_flag is equal to 1 and lm_mode_flag is equal to 1, then signaling bins in truncated unary to indicate the chroma intra prediction mode in MDLM_L mode, MDLM_T mode, MMLM_LM mode, MMLM_L mode and MMLM_T mode.

Intra template matching is a coding tool to derive prediction of a block by using the correlation between a template and the block. The template of the block are regions neighbouring the block.

In some implementations, a template-based intra mode derivation method was proposed, hereinafter referred to as TIMD. TIMD apply the intra template matching to calculate a difference between a plurality of reconstructed samples of a template and a plurality of prediction samples of the template. The template may be regions neighbouring the current block. The regions may be a rectangular region above the current block and a rectangular region left the current block. The rectangular region above the current block may be referred to as above template region and the rectangular region left to the current block may be referred to as left template region, hereinafter. The difference between reconstructed samples of the template regions and prediction samples of the template regions may be referred to as a template cost, hereinafter.

The prediction samples of the template region may be predict based on reference line of the template region. In some implementations, the reference line may be the samples neighbouring the template region. In some implementations, the candidate modes may be intra prediction modes. For example, the intra prediction modes may be Planar, DC and angular modes, the number of angular modes may be 65 or 129. In some implementations, the candidate modes may be the modes in the most probable mode (MPM) list. In some implementations, a cost between the template region and its prediction from the candidate mode may be sum of absolute difference (SAD) or sum of absolute transformed difference (SATD).

See FIG. 7, which shows the template regions of the current block and the reference line of template regions. In FIG. 7, the current block width denoted as W and the current coding block height denoted as H, the template region on the above of the current block has same width with the current block and the height of the above template region may be denoted as K, the template region on the left of the current block has same height with the current block and the width of the left template region may be denoted as K. The template region may be a set of reconstructed samples.

Intra template matching may generate a plurality of template matching (TM) costs of candidates of a candidate list (For example, the candidate list may be most probable mode (MPM) list). The candidate mode with the minimum cost may be selected as a TIMD mode. There may be a TIMD flag to indicate whether use TIMD mode as a final prediction mode to predict/reconstruct the current block. Signaling the TIMD flag instead of signaling an intra prediction mode index when the value of TIMD flag equal to 1.

SUMMARY OF THE INVENTION

Accordingly, the disclosure is directed to a method for determining a specific linear model and a video processing device, which may be used to solve the above technical problems.

The embodiments of the disclosure provide a method for determining a specific linear model, adapted to a video processing device, including: determining a plurality of linear model parameters of each of a plurality of linear models; determining a chroma template reconstruction and a luma template, wherein the chroma template reconstruction and the luma template are associated with a specific chroma block; determining a chroma template prediction corresponding to each of the plurality of linear models based on the luma template and the corresponding linear model parameters; determining a template cost of each of the plurality of linear models based on the chroma template reconstruction and the corresponding chroma template prediction; and selecting the specific linear model from the linear models based on the template cost of each of the plurality of linear models.

The embodiments of the disclosure provide a video processing device including a storage circuit and a processor. The storage circuit stores a program code. The processor is coupled to the storage circuit and accessing the program code to perform: determining a plurality of linear model parameters of each of a plurality of linear models; determining a chroma template reconstruction and a luma template, wherein the chroma template reconstruction and the luma template are associated with a specific chroma block; determining a chroma template prediction corresponding to each of the plurality of linear models based on the luma template and the corresponding linear model parameters; determining a template cost of each of the plurality of linear models based on the chroma template reconstruction and the corresponding chroma template prediction; and selecting a specific linear model from the linear models based on the template cost of each of the plurality of linear models.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
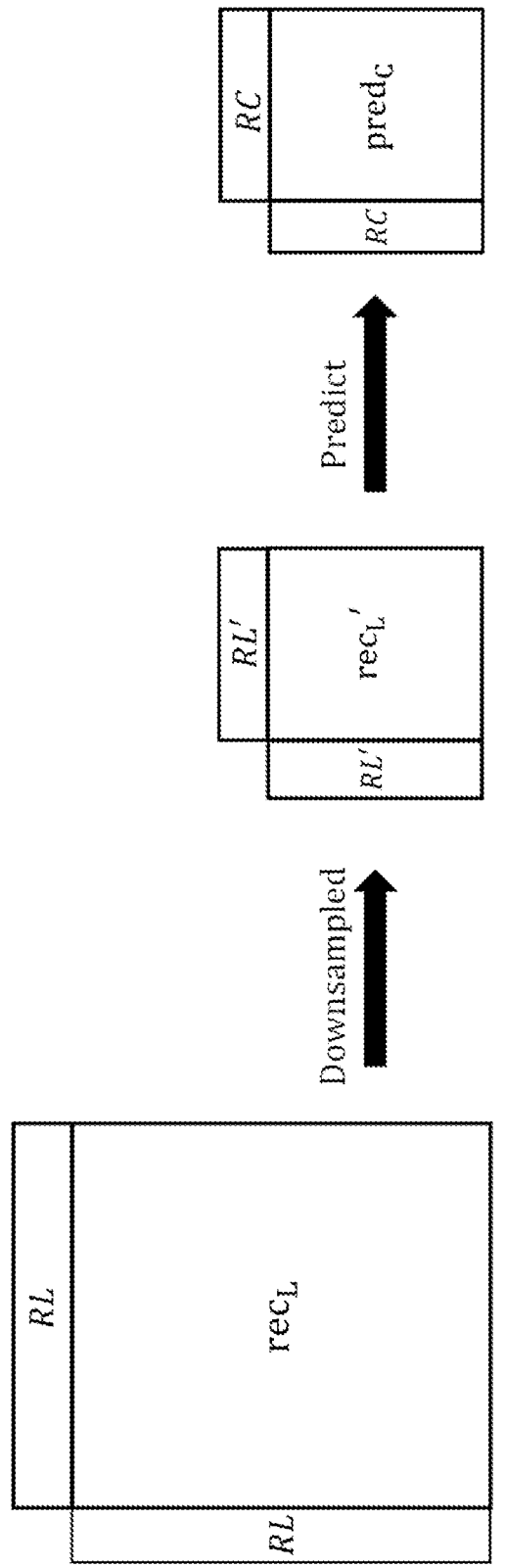
FIG. 1 shows a schematic diagram of the derivation of CCLM.
Figure 2:
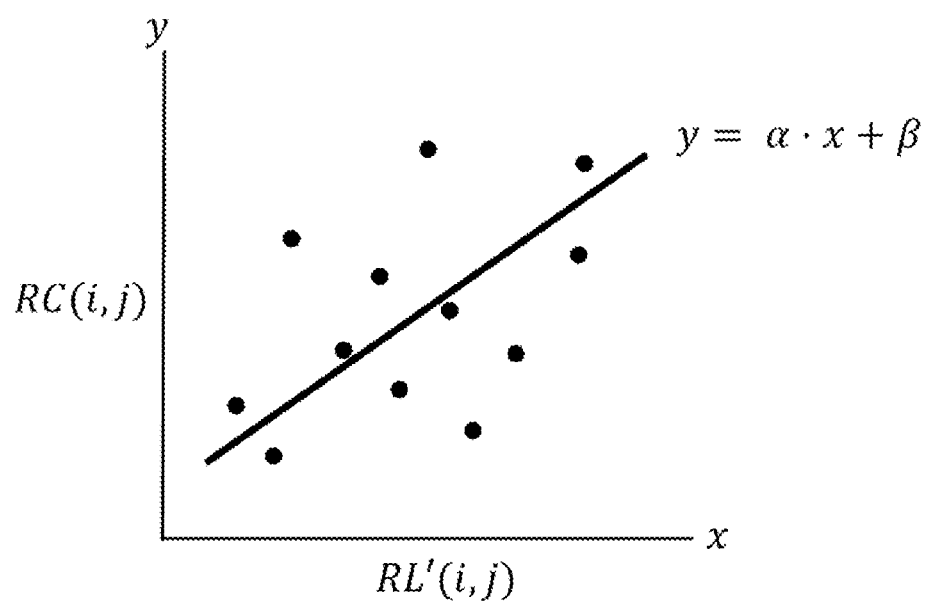
FIG. 2 shows a schematic diagram of the CCLM.

Reference will now be made in detail to the present preferred embodiments of the invention, examples of which are illustrated in the accompanying drawings. Wherever possible, the same reference numbers are used in the drawings and the description to refer to the same or like parts.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the implementations described herein. Alterations and further modifications of the inventive features illustrated here, and additional applications of the principles of the inventions as illustrated here, which would occur to one skilled in the relevant art and having possession of this disclosure, are to be considered within the scope of the invention.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The connection may include, but is not limited to, mechanical, electrical, and magnetic connections. The term "comprising" means "including, but not necessarily limited to"; it specifically indicates open-ended inclusion or membership in a so-described combination, group, series, and the like.

The implementations shown and described in this disclosure are only examples. Even though numerous characteristics and advantages of the present technology have been set forth in this disclosure, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

Figure 8A:
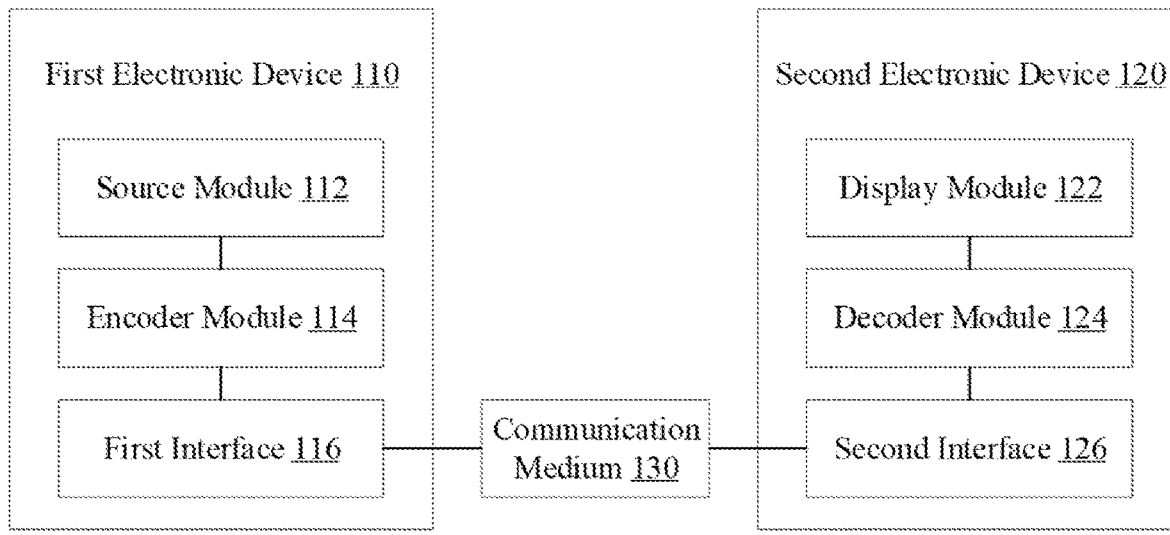
FIG. 8A illustrates a block diagram of a system configured to encode and decode video data according to an example implementation of the present disclosure.

FIG. 8A illustrates a block diagram of a system 100 configured to encode and decode video data according to an example implementation of the present disclosure. The system 100 includes a first electronic device 110, a second electronic device 120, and a communication medium 130. The first electronic device 110 may be a source device including any device configured to encode video data and transmit encoded video data to the communication medium 130. The second electronic device 120 may be a destination device including any device configured to receive encoded video data via the communication medium 130 and to decode encoded video data.

In at least one implementation, the first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

In at least one implementation, the first electronic device 110 and/or the second electronic device 120 may be a mobile phone, a tablet, a desktop, a notebook, or other electronic devices. FIG. 8A merely illustrates one example of the first electronic device 110 and the second electronic device 120. The first electronic device 110 and second electronic device 120 in other implementations may include more or less components than illustrated or have a different configuration of the various components.

In at least one implementation, the source module 112 may include a video capture device to capture a new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

In at least one implementation, the encoder module 114 and the decoder module 124 may each be implemented as any of a variety of suitable encoder/decoder circuitry such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When implemented partially in software, a device may store instructions for the software in a suitable, non-transitory computer-readable medium and execute the instructions in hardware using one or more processors to perform the disclosed methods. In at least one implementation, each of the encoder module 114 and the decoder module 124 may be included in one or more encoders or decoders, any of which may be integrated as part of a combined encoder/decoder (CODEC) in a device.

In at least one implementation, the first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 116 and the second interface 126 may each include any device configured to transmit and/or store a compliant video bitstream via the communication medium 130 and to receive the compliant video bitstream via the communication medium 130.

In at least one implementation, the first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 122 may include a display using liquid crystal display (LCD) technology, plasma display technology, organic light emitting diode (OLED) display technology, or light emitting polymer display (LPD) technology with other display technologies used in other implementations. The display module 122 may include a high-definition display or an ultra-high definition display.

Figure 8B:
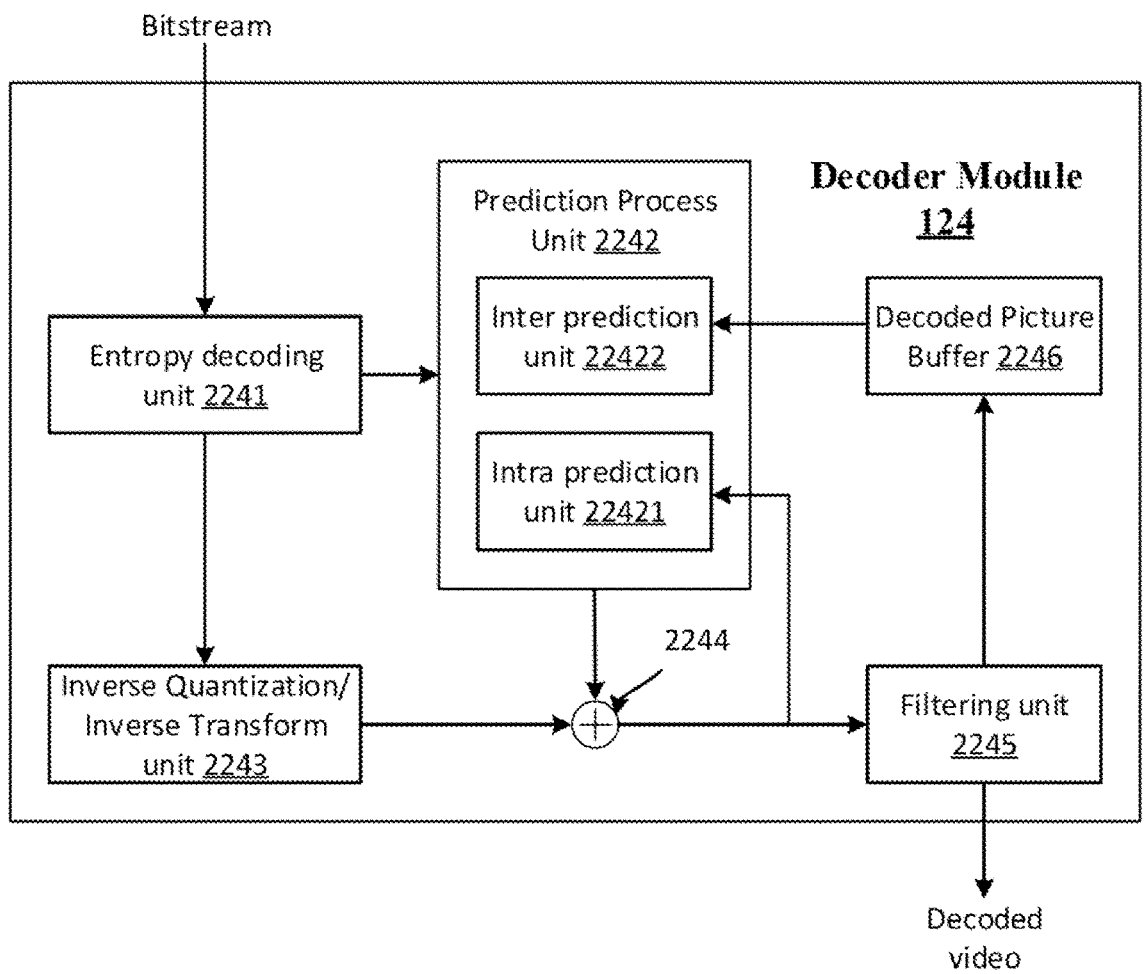
FIG. 8B illustrates a block diagram representing an implementation of the decoder module of the second electronic device in FIG. 8A, according to an example implementation of the present application.

FIG. 8B illustrates a block diagram representing an implementation of the decoder module 124 of the second electronic device 120 in FIG. 8A, according to an example implementation of the present application. The decoder module 124 includes an entropy decoder (e.g., an entropy decoding unit 2241), a prediction processor (e.g., a prediction process unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction process unit 2242 further includes an intra prediction processor (e.g., an intra prediction unit 22421) and an inter prediction processor (e.g., an inter prediction unit 22422). The decoder module 124 receives a bitstream and decodes the bitstream to output decoded video.

The entropy decoding unit 2241 may receive the bitstream including a plurality of syntax elements from the second interface 126 in FIG. 8A and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

In at least one implementation, the entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

In at least one implementation, the prediction process unit 2242 may receive syntax elements such as motion vectors, intra modes, partition information, and other syntax information from the entropy decoding unit 2241. The prediction process unit 2242 may receive the syntax elements including the partition information and divide image frames according to the partition information.

In at least one implementation, each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2242 receives predicted data including the intra mode or the motion vector for a current image block of a specific one of the image frames. The current image block may be the luminance block or one of the chrominance blocks in the specific image frame.

In at least one implementation, the intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. In at least one implementation, the intra prediction unit 22421 may reconstruct a plurality of chroma components of the current block unit based on a plurality of luma components of the current block unit when the chroma components are reconstructed by the prediction process unit 2242.

In at least one implementation, the intra prediction unit 22421 may reconstruct a plurality of chroma components of the current block unit based on the plurality of luma components of the current block unit when the luma components of the current block are reconstructed by the prediction process unit 2242.

In at least one implementation, the inter prediction unit 22422 may perform inter-predictive coding of the current block unit relative to one or more blocks in one or more reference image blocks based on syntax elements related to the motion vector in order to generate the predicted block.

In at least one implementation, the motion vector may indicate a displacement of the current block unit within the current image block relative to a reference block unit within the reference image block. The reference block unit is a block determined to closely match the current block unit.

In at least one implementation, the inter prediction unit 22422 receives the reference image block stored in the decoded picture buffer 2246 and reconstructs the current block unit based on the received reference image blocks.

In at least one implementation, the inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

In at least one implementation, the inverse transformation may be inversely applied by the transformation process such as discrete cosine transform (DCT), discrete sine transform (DST), adaptive multiple transform (AMT), mode-dependent non-separable secondary transform (MDNSST), hypercube-givens transform (HyGT), signal dependent transform, Karhunen-Loéve transform (KLT), wavelet transform, integer transform, sub-band transform or a conceptually similar transform.

In at least one implementation, the inverse transformation may convert the residual information from a transform domain, such as a frequency domain, back to the pixel domain. The degree of inverse quantization may be modified by adjusting a quantization parameter. The summer 2244 adds the residual block to the predicted block from the prediction process unit 2242 to produce a reconstructed block.

In at least one implementation, the summer 2244 adds the reconstructed residual block to the predicted block provided from the prediction process unit 2242 to produce a reconstructed block.

In at least one implementation, the filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF. Such filters are not shown for brevity but may filter the output of the summer 2244.

The filtering unit 2245 may output the decoded video to the display module 122 or other video receiving unit after the filtering unit 2245 performs the filtering process for the reconstructed blocks of the specific image frame.

In at least one implementation, the decoded picture buffer 2246 may be a reference picture memory that stores the reference block for use by the prediction process unit 2242 in decoding the bitstream (in inter coding modes). The decoded picture buffer 2246 may be formed by any of a variety of memory devices such as dynamic random-access memory (DRAM), including synchronous DRAM (SDRAM), magneto-resistive RAM (MRAM), resistive RAM (RRAM), or other types of memory devices.

In at least one implementation, the decoded picture buffer 2246 may be on-chip with other components of the decoder module 124 or off-chip relative to those components.

Figure 8C:
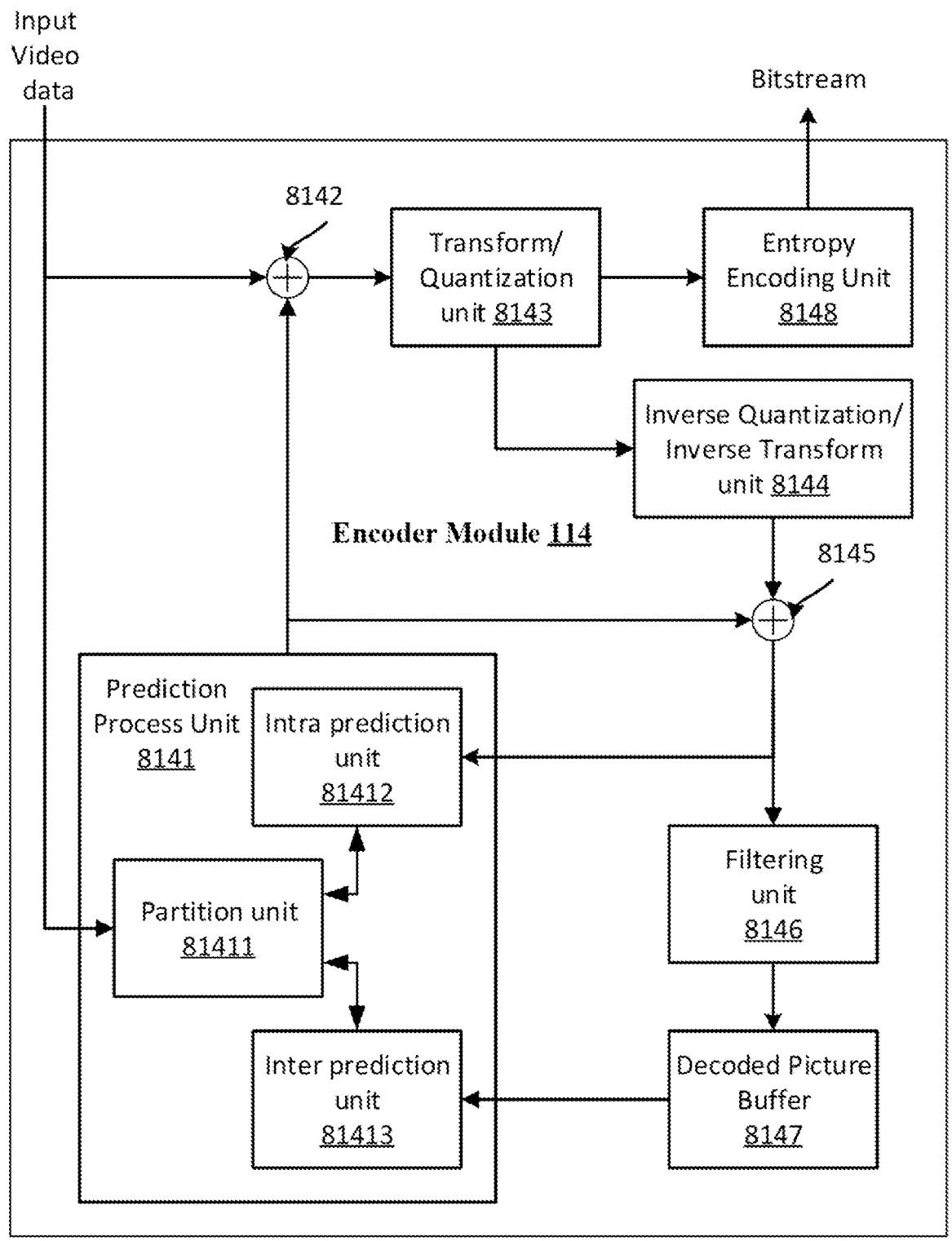
FIG. 8C illustrates an encoder module that is an implementation of the encoder module in FIG. 8A.

FIG. 8C illustrates an encoder module 114 that is an implementation of the encoder module 114 in FIG. 8A. The encoder module 114 may include a prediction processor (e.g., a prediction process unit 8141), at least a first summer (e.g., a first summer 8142) and a second summer (e.g., a second summer 8145), a transform/quantization processor (e.g., a transform/quantization unit 8143), an inverse quantization/inverse transform processor (e.g., an inverse quantization/inverse transform unit 8144), a filter (e.g., a filtering unit 8146), a decoded picture buffer (e.g., a decoded picture buffer 8147), and an entropy encoder (e.g., an entropy encoding unit 8148). The prediction process unit 8141 of the encoder module 114 may further include a partition processor (e.g., a partition unit 81411), an intra prediction processor (e.g., an intra prediction unit 81412), and an inter prediction processor (e.g., an inter prediction unit 81413). The encoder module 114 may receive the source video and encode the source video to output a bitstream.

The encoder module 114 may receive a source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

In at least one implementation, the encoder module 114 may perform additional sub-divisions of the source video. It should be noted that these implementations are generally applicable to video coding regardless of how the source video is partitioned prior to and/or during the encoding.

In at least one implementation, during the encoding process, the prediction process unit 8141 may receive a current image block of a specific one of the image frames during the encoding process. The current image block may be the luminance block or one of the chrominance blocks in the specific image frame.

The partition unit 81411 may divide the current image block into multiple block units. The intra prediction unit 81412 may perform intra-predictive coding of a current block unit relative to one or more neighboring blocks in the same frame as the current block unit in order to provide spatial prediction. The inter prediction unit 81413 may perform inter-predictive coding of the current block unit relative to one or more blocks in one or more reference image blocks to provide temporal prediction.

In at least one implementation, the prediction process unit 8141 may select one of the coding results generated by the intra prediction unit 81412 and the inter prediction unit 81413 based on a mode selection method, such as a cost function. The mode selection method may be a rate-distortion optimization (RDO) process.

The prediction process unit 8141 may determine the selected coding result and provide a predicted block corresponding to the selected coding result to the first summer 8142 for generating a residual block and to the second summer 8145 for reconstructing the encoded block unit. The prediction process unit 8141 may further provide syntax elements such as motion vectors, intra mode indicators, partition information, and other syntax information to the entropy encoding unit 8148.

In at least one implementation, the intra prediction unit 81412 may intra predict the current block unit. The intra prediction unit 81412 may determine an intra prediction mode directed toward a reconstructed sample neighboring the current block unit in order to encode the current block unit.

In at least one implementation, the intra prediction unit 81412 may encode the current block unit using various intra prediction modes and the intra prediction unit 81412 or the prediction process unit 8141 may select an appropriate intra prediction mode from the various intra prediction modes. The intra prediction unit 81412 may encode the current block unit using a cross component prediction mode to predict one of the two chroma components of the current block unit based on the luma components of the current block unit. The intra prediction unit 81412 may predict a first one of the two chroma components of the current block unit based on the second of the two chroma components of the current block unit.

In at least one implementation, the inter prediction unit 81413 may inter predict the current block unit as an alternative to the intra prediction performed by the intra prediction unit 81412. The inter prediction unit 81413 may perform motion estimation to estimate motion of the current block unit for generating a motion vector.

The motion vector may indicate a displacement of the current block unit within the current image block relative to a reference block unit within a reference image block. The inter prediction unit 81413 may receive at least one reference image block stored in the decoded picture buffer 8147 and estimate the displacement based on the received reference image blocks to generate the motion vector.

In at least one implementation, the first summer 8142 may generate the residual block by subtracting the prediction block determined by the prediction process unit 8141 from the original current block unit. The first summer 8142 may represent the component or components that perform this subtraction operation.

In at least one implementation, the transform/quantization unit 8143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform or a conceptually similar transform.

In at least one implementation, the transform may convert the residual information from a pixel value domain to a transform domain, such as a frequency domain. The degree of quantization may be modified by adjusting a quantization parameter.

In at least one implementation, the transform/quantization unit 8143 may perform a scan of the matrix including the quantized transform coefficients. Alternatively, the entropy encoding unit 8148 may perform the scan.

In at least one implementation, the entropy encoding unit 8148 may receive a plurality of syntax elements from the prediction process unit 8141 and the transform/quantization unit 8143 including a quantization parameter, transform data, motion vectors, intra modes, partition information, and other syntax information. The entropy encoding unit 8148 may encode the syntax elements into the bitstream.

In at least one implementation, the entropy encoding unit 8148 may entropy encode the quantized transform coefficients by performing CAVLC, CABAC, SBAC, PIPE coding or another entropy coding technique to generate an encoded bitstream. The encoded bitstream may be transmitted to another device (second electronic device 120 in FIG. 8A) or archived for later transmission or retrieval.

In at least one implementation, the inverse quantization/inverse transform unit 8144 may apply inverse quantization and inverse transformation to reconstruct the residual block in the pixel domain for later use as a reference block. The second summer 8145 may add the reconstructed residual block to the prediction block provided from the prediction process unit 8141 in order to produce a reconstructed block for storage in the decoded picture buffer 8147.

In at least one implementation, the filtering unit 8146 may include a deblocking filter, a SAO filter, a bilateral filter, and/or an ALF to remove blocking artifacts from the reconstructed block. Additional filters (in loop or post loop) may be used in addition to the deblocking filter, the SAO filter, the bilateral filter and the ALF. Such filters are not shown for brevity and may filter the output of the second summer 8145.

In at least one implementation, the decoded picture buffer 8147 may be a reference picture memory that stores the reference block for use by the encoder module 114 to encode video, such as in intra or inter coding modes. The decoded picture buffer 8147 may include a variety of memory devices such as DRAM, including SDRAM, MRAM, RRAM), or other types of memory devices. The decoded picture buffer 8147 may be on-chip with other components of the encoder module 114 or off-chip relative to those components.

Figure 9:
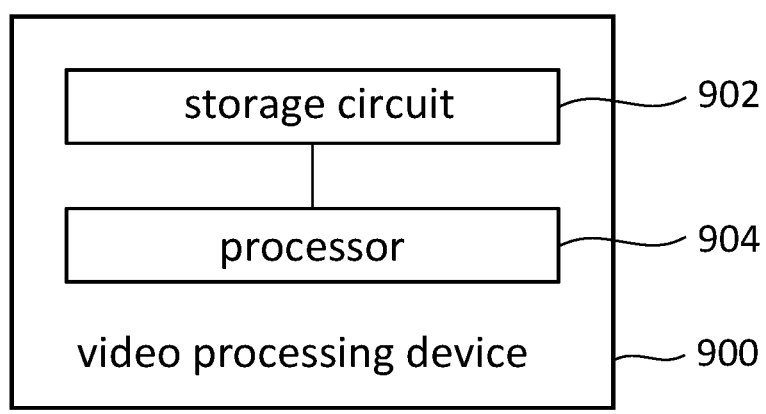
FIG. 9 shows a schematic diagram of a video processing device according to an embodiment of the disclosure.

See FIG. 9, which shows a schematic diagram of a video processing device according to an embodiment of the disclosure. In various embodiments, the video processing device 900 can be implemented as any smart device and/or computer device. In some embodiments, the video processing device 900 can be used to implement the first electronic device 110 or the second electronic device 120, but the disclosure is not limited thereto.

In FIG. 9, the video processing device 900 includes a storage circuit 902 and a processor 904. The storage circuit 902 is one or a combination of a stationary or mobile random access memory (RAM), read-only memory (ROM), flash memory, hard disk, or any other similar device, and which records a plurality of modules that can be executed by the processor 904.

The processor 904 may be coupled with the storage circuit 902, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 904 may access the modules stored in the storage circuit 902 to implement the method for determining a specific linear model provided in the disclosure, which would be further discussed in the following.

Figure 10:
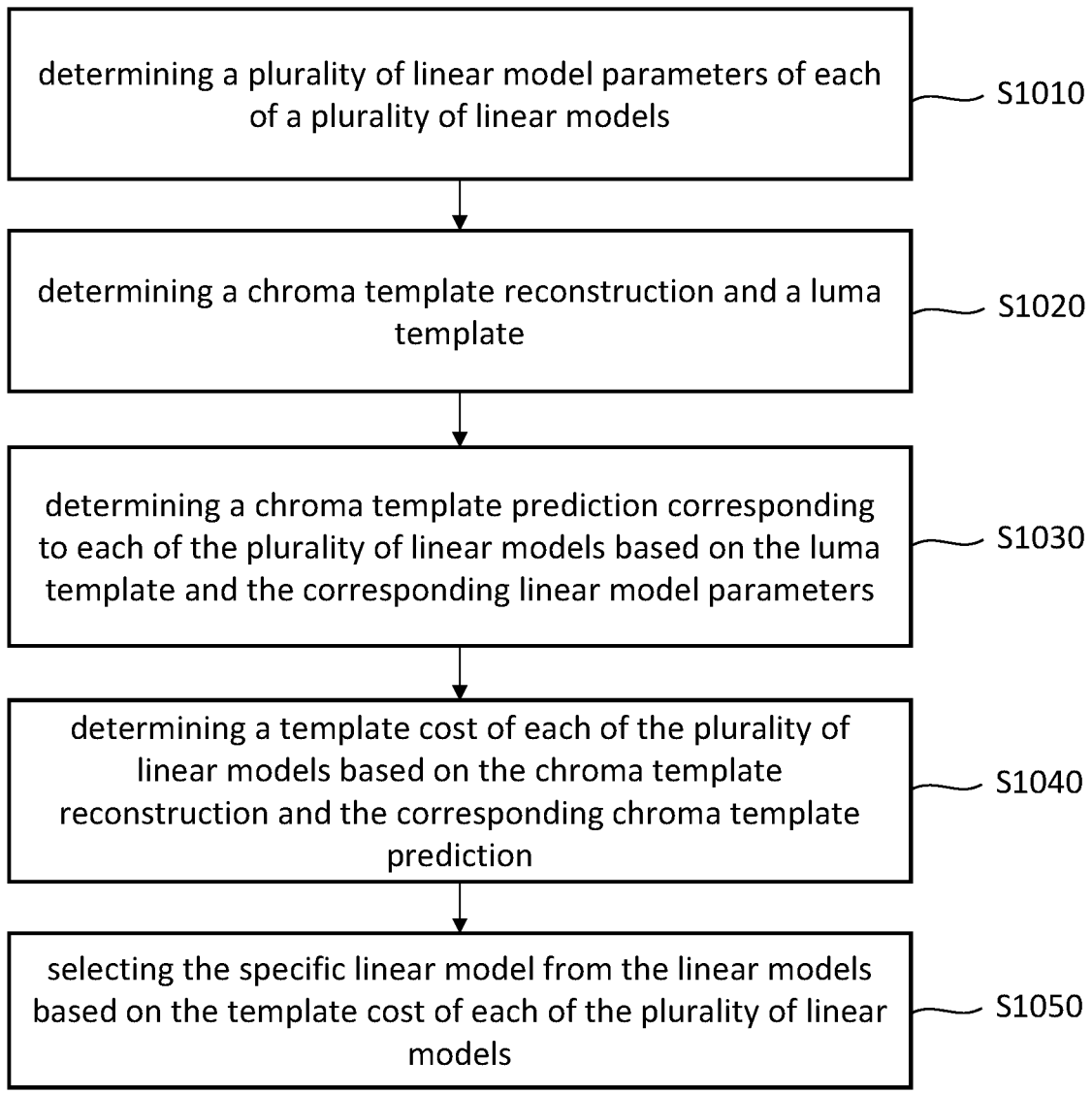
FIG. 10 shows a flow chart of the method for determining a specific linear model according to an embodiment of the disclosure.

See FIG. 10, which shows a flow chart of the method for determining a specific linear model according to an embodiment of the disclosure. The method of this embodiment may be executed by the video processing device 900 in FIG. 9, and the details of each step in FIG. 10 will be described below with the components shown in FIG. 9.

In step S1010, the processor 904 determines a plurality of linear model parameters of each of a plurality of linear models. In various embodiments, the considered linear models can be the above-mentioned linear models (such as MDLM_LM mode, MDLM_L mode and MDLM_T mode), and the corresponding linear model parameters may include the $\alpha$ and $\beta$ corresponding to each considered linear model, but the disclosure is not limited thereto.

In some embodiments, the considered linear models can be any prediction mode using at least one linear model. The corresponding linear model parameters of the considered linear models may be derived based on LMS or a plurality of selected reference samples.

In some embodiments, the considered linear models can include MDLM_LM_selected mode, MDLM_L_selected mode, MDLM_T_selected mode, MMLM_LM_selected mode, MMLM_L_selected mode, MMLM_T_selected mode, MDLM_LM_LMS mode, MDLM_L_LMS mode, MDLM_T_LMS mode, MMLM_LM_LMS mode, MMLM_L_LMS mode and MMLM_T_LMS mode. The difference between selected mode and LMS mode may be the derivation of the parameters in LM modes.

For example, the difference between the MDLM_LM_selected mode and the MDLM_LM_LMS mode is the derivation of parameters of linear models. The parameters of the linear model in MDLM_LM_selected may be generated by selecting four neighbouring reference samples. The parameters of the linear model in MDLM_LM_LMS may be generated by LMS algorithm with all neighbouring reference samples.

In some implementations, the considered linear models may include other LM modes not described in this disclosure without departing from this disclosure.

In step S1020, the processor 904 determines a chroma template reconstruction and a luma template, wherein the chroma template reconstruction and the luma template are associated with a specific chroma block.

In the embodiment of the disclosure, the specific chroma block corresponds to a video frame, wherein the video frame may be one of the frames of a particular video obtained (e.g., received from a specific video source) by the video processing device 900, but the disclosure is not limited thereto.

In one embodiment, the video frame includes a chroma component having a plurality of chroma blocks, and the specific chroma block is one of the chroma blocks of the chroma component. For example, the video frame may have one luma component corresponding to Y and two chroma components corresponding to Cb and Cr, and the considered chroma component having the specific chroma block may be the chroma component corresponding to Cb or Cr, but the disclosure is not limited thereto.

In one embodiment, in the procedure of determining the chroma template reconstruction, the processor 904 determines at least one neighbouring chroma region of the specific chroma block as the chroma template reconstruction, wherein each neighbouring region comprises a plurality of reconstructed chroma samples.

Figure 11A:
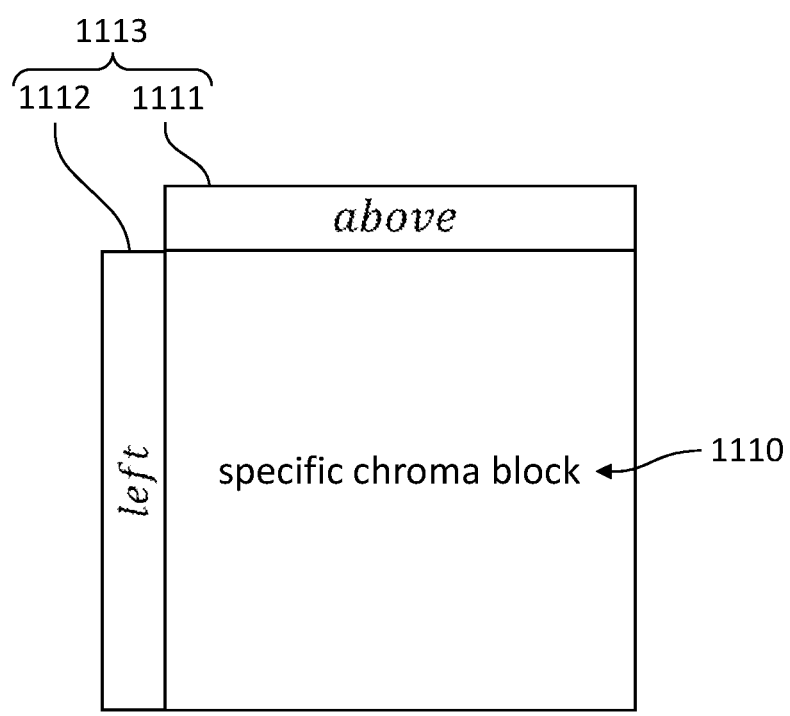
FIG. 11A shows a schematic diagram of determining the chroma template reconstruction according to an embodiment of the disclosure.

See. FIG. 11A, which shows a schematic diagram of determining the chroma template reconstruction according to an embodiment of the disclosure. In FIG. 11A, for the considered specific chroma block 1110, the processor 904 may determine neighbouring chroma regions 1111 and 1112 of the specific chroma block 1110, wherein the neighbouring chroma region 1111 may be a first chroma region above the specific chroma block 1110 and the neighbouring chroma region 1112 may be a second chroma region on the left of the specific chroma block 1110, and each neighbouring region 1111 and 1112 includes a plurality of reconstructed chroma samples, but the disclosure is not limited thereto.

In the embodiments of the disclosure, the processor 904 may determine the neighbouring chroma regions 1111 and 1112 as the chroma template reconstruction 1113 of the specific chroma block 1110, but the disclosure is not limited thereto. In other embodiments, the processor 904 can also determine one of the neighbouring chroma regions 1111 and 1112 as the chroma template reconstruction 1113 of the specific chroma block 1110, but the disclosure is not limited thereto.

Figure 7:
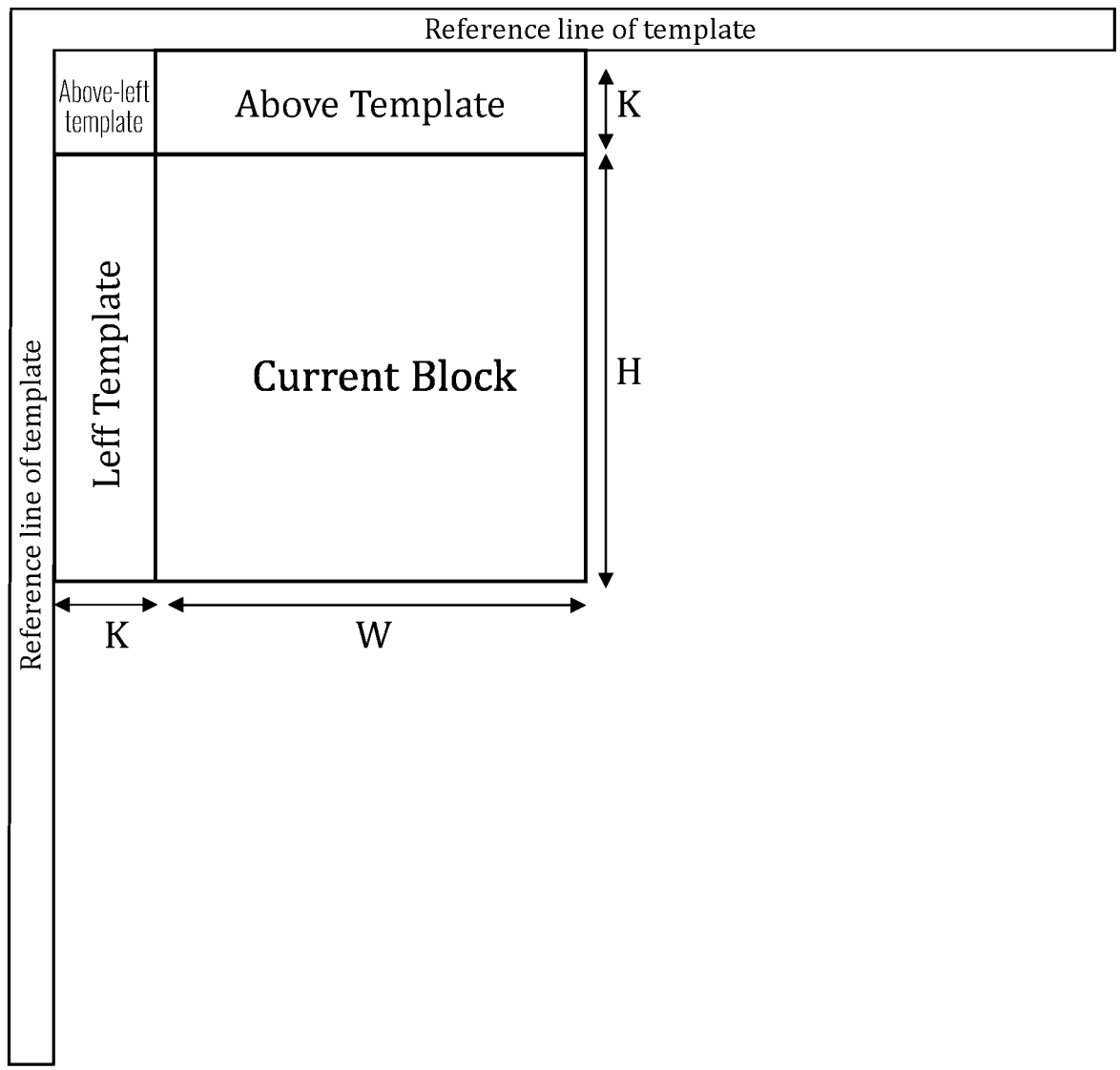
FIG. 7 shows the template regions of the current block and the reference line of template regions.

In some embodiments, the processor 904 may determine the sizes of the neighbouring chroma regions 1111 and 1112 based on FIG. 7, wherein the neighbouring chroma region 1111 can be regarded as corresponding to the above template in FIG. 7, and the neighbouring chroma region 1112 can be regarded as corresponding to the left template in FIG. 7, but the disclosure is not limited thereto.

In one embodiment, in the procedure of determining the luma template, the processor 904 determines the luma template based on a luma block corresponding to the specific chroma block.

Figure 11B:
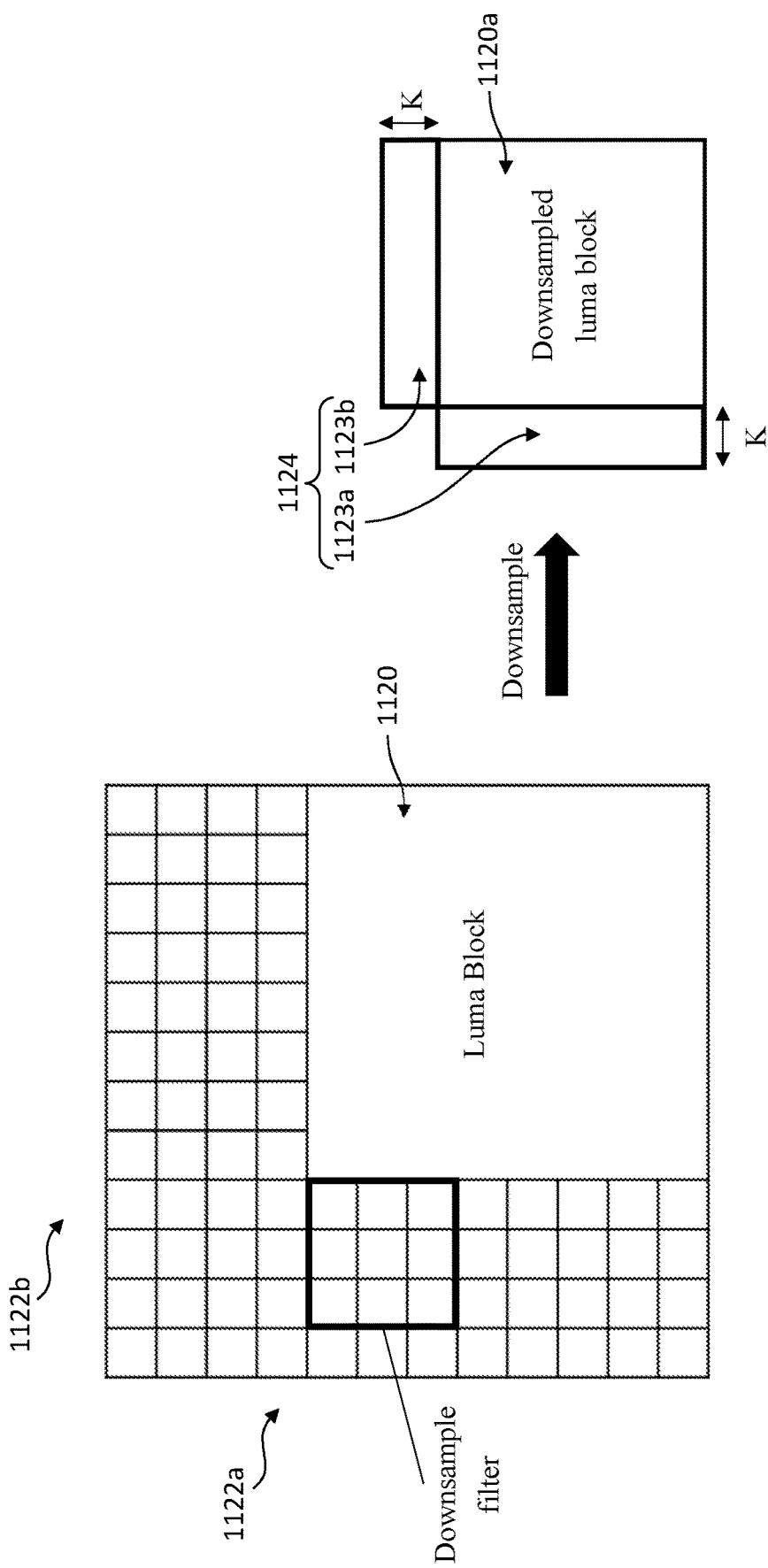
FIG. 11B shows a schematic diagram of determining the luma template according to an embodiment of the disclosure.

See FIG. 11B, which shows a schematic diagram of determining the luma template according to an embodiment of the disclosure. In FIG. 11B, it is assumed that the luma block 1120 is the luma block corresponding to the specific chroma block 1110 in FIG. 11A. In this case, the processor 904 can determine neighbouring luma regions 1122a and 1122b of the luma block 1120, wherein each of the neighbouring luma region 1122a and 1122b includes a plurality of luma samples (wherein each luma sample is illustrated as square in FIG. 11B). Next, the processor 904 can downsample the at least one neighbouring luma region 1122a, 1122b and the luma block 1120.

In FIG. 11B, luma block obtained via downsampling the luma block 1120 may be the downsampled luma block 1120a, but the disclosure is not limited thereto. The neighbouring luma regions obtained via downsampling the neighbouring luma region 1122a, 1122b may be the downsampled neighbouring luma region 1123a and 1123b, wherein the downsampled neighbouring luma region 1123b may be a first luma region above the downsampled luma block 1120a, and the downsampled neighbouring luma region 1123a may be a second luma region on the left of the downsampled luma block 1120a.

In one embodiment, the processor 904 can downsample the neighbouring luma region 1122a and 1122b and the luma block 1120 by using a downsample filter, wherein the downsample filter is determined based on a video format of the video frame corresponding to the specific chroma block 1110.

In some implementations, if the video format is YUV 4:4:4, then the downsampling process may not need. In this case, the neighbouring luma region 1122a, 1122b may be equal to the downsampled neighbouring luma region 1123a and 1123b, respectively.

In some implementations, if the video format is YUV 4:2:2, then the downsample filter may be equal to [1 2 1]. The plurality of downsampled reconstructed luma samples may be derived as follow:

$$rec'_L(i,j)=(rec_L(i-1,j)+2 \times rec_L(i,j)+rec_L(i+1,j)+2)>>2$$

In some implementations, if the video format is YUV 4:2:0, then the downsample filter may be equal to $$\begin{bmatrix} 1 & 2 & 1 \\ 1 & 2 & 1 \end{bmatrix} \text{ or } \begin{bmatrix} 0 & 1 & 0 \\ 1 & 4 & 1 \\ 0 & 1 & 0 \end{bmatrix}$$

based on a sequence parameter set (SPS) level flag. The SPS level flag specifies whether chroma sample positions shifted downward by 0.5 in units of luma samples relative to corresponding luma sample positions. If the SPS level flag specifies the chroma sample positions shifted downward by 0.5 in units of luma samples relative to corresponding luma sample positions, then the downsample filter may be equal to $$\begin{bmatrix} 0 & 1 & 0 \\ 1 & 4 & 1 \\ 0 & 1 & 0 \end{bmatrix}.$$

The plurality of down sampled reconstructed luma samples may be derived as follow:

$$rec'_L(i,j)=(rec_L(2i,2j-1)+rec_L(2i-1,2j)+4 \times rec_L(2i,2j)+rec_L(2i+1,2j)+rec_L(2i,2j+1)+4)>>3$$

If the SPS level flag specifies the chroma sample positions are not shifted relative to corresponding luma sample positions, then the downsample filter may be equal to $$\begin{bmatrix} 1 & 2 & 1 \\ 1 & 2 & 1 \end{bmatrix}.$$

The plurality of down sampled reconstructed luma samples may be derived as follow:

$$rec'_L(i,j)=(rec_L(2i-1,2j)+rec_L(2i-1,2j+1)+2 \times rec_L(2i,2j)+2 \times rec_L(2i,2j+1)+rec_L(2i+1,2j)+rec_L(2i+1,2j+1)+4)>>3$$

In some implementations, the size of the downsampled neighbouring luma region 1123b may be equal to chroma block width times a positive integer K. The size of the downsampled neighbouring luma region 1123a may be equal to chroma block height times the positive integer K. For example, the positive integer K may be equal to 2.

With the downsampled neighbouring luma region 1123a, 1123b, the processor 904 can determine the downsampled neighbouring luma regions 1123a, 1123b as the luma template 1124. In other embodiments, the processor 904 can determine the downsampled neighbouring luma region 1123a or 1123b as the luma template 1124, but the disclosure is not limited thereto.

Referring back to FIG. 10, in step S1030, the processor 904 determines a chroma template prediction corresponding to each of the plurality of linear models based on the luma template and the corresponding linear model parameters.

In the embodiments of the disclosure, the processor 904 can perform the same procedure for each of the considered linear models. For better understanding, the concept of the disclosure would be discussed on the basis of one of the considered linear models (referred to as a first linear model).

In one embodiment, the processor 904 can determine the chroma template prediction corresponding to the first linear model based on the luma template 1124 and the corresponding linear model parameters.

In the procedure of determining the chroma template prediction corresponding to the first linear model, the processor 904 can determine a first linear function based on the linear model parameters of the first linear model and determine the chroma template prediction corresponding to the first linear model by using the first linear function to process the luma template 1124.

In one embodiment, the linear model parameters of the first linear model are characterised by $\alpha$ and $\beta$, and a sample in position (i, j) of the chroma template prediction corresponding to the first linear model is characterised by:

$$Pred_{template}(i,j)=\alpha \times rec'_L(i,j)+\beta,$$

wherein $rec'_L(i,j)$ is a luma sample in position (i, j) of the luma template 1124.

For example, in an embodiment where the first linear model is the MDLM_LM mode, and the first linear function of the first linear model can be characterized by "$Pred_{template,MDLM\_LM}(i, j)=\alpha_{MDLM\_LM} \times rec'_L(i,j)+\beta_{MDLM\_LM}$", wherein $Pred_{template,MDLM\_LM}(i, j)$ may be the chroma template prediction in position (i, j). $\alpha_{MDLM\_LM}$ and $\beta_{MDLM\_LM}$ are the linear model parameters of the MDLM_LM mode. $rec'_L(i,j)$ may be the sample in position (i, j) of the luma template 1124.

For another example, in an embodiment where the first linear model is the MDLM_L mode, and the first linear function of the first linear model can be characterized by "$Pred_{template,MDLM\_L}(i, j)=\alpha_{MDLM\_L} \times rec'_L(i, j)+\beta_{MDLM\_L}$", wherein $Pred_{template,MDLM\_L}(i, j)$ may be the chroma template prediction in position (i, j). $\alpha_{MDLM\_L}$ and $\beta_{MDLM\_L}$ are the linear model parameters of the MDLM_L mode. $rec'_L(i,j)$ may be the sample in position (i, j) of the luma template 1124.

For other linear models, the processor 904 can perform operations similar to the above to determine the corresponding chroma template prediction.

With the chroma template prediction of each linear model, the processor 904 performs step S1040 to determine a template cost of each of the plurality of linear models based on the chroma template reconstruction 1113 and the corresponding chroma template prediction.

Taking the first linear model for example, the processor 904 can determine a first difference between the chroma template reconstruction 1113 and the chroma template prediction corresponding to the first linear model as the template cost of the first linear model.

In some implementations, the first difference may be calculated by using sum of absolute difference (SAD) or sum of absolute transformed difference (SATD). That is, the processor 904 may calculate the SAD or SATD between the chroma template reconstruction 1113 and the chroma template prediction corresponding to the first linear model as the template cost of the first linear model.

In some implementations, the first difference may be calculated by using mean square error (MSE). That is, the processor 904 may calculate the MSE between the chroma template reconstruction 1113 and the chroma template prediction corresponding to the first linear model as the template cost of the first linear model, but the disclosure is not limited thereto.

For each of the linear models, the processor 904 can the corresponding template cost based on the teaching in the above.

Next, in step S1050, the processor 904 selecting the specific linear model from the linear models based on the template cost of each of the plurality of linear models.

In one embodiment, the specific linear model may have a lowest template cost among the linear models. In other embodiments, the specific linear model may have an N-th lowest template cost among the linear models, wherein N may be any integer preferred by the designer, but the disclosure is not limited thereto.

In one embodiment, after determining the specific linear model, the processor 904 can further use the specific linear model to generate a first chroma prediction result of the specific chroma block 1110.

Figure 3A:
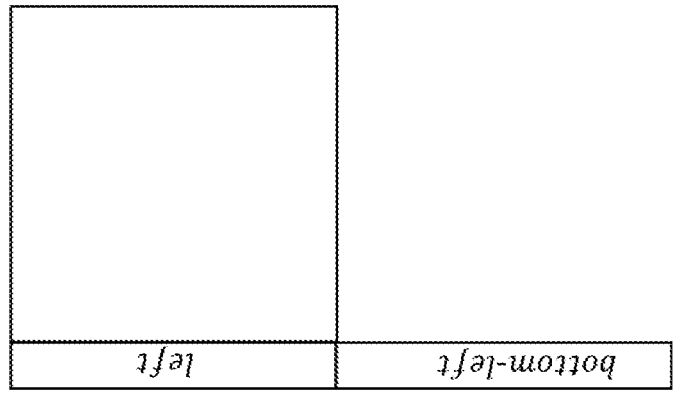
FIGS. 3A to 3C show the reference sample regions neighbouring the chroma block and the corresponding downsampled reconstructed luma block.

For example, if the specific linear model is determined to be MDLM_LM mode, the processor 904 may use the corresponding reference sample regions (e.g., the reference sample regions on the left and above of the specific chroma block 1110) shown in FIG. 3A to determine the corresponding linear model parameters and accordingly generate the first chroma prediction result of the specific chroma block 1110.

Figure 3B:
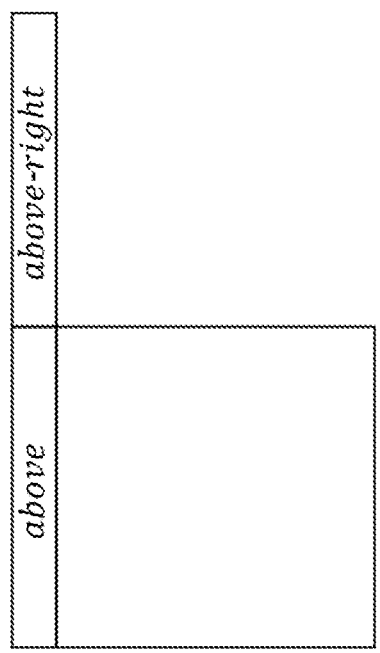

For another example, if the specific linear model is determined to be MDLM_T mode, the processor 904 may use the corresponding reference sample regions (e.g., the reference sample regions on the above and above-right of the specific chroma block 1110) shown in FIG. 3B to determine the corresponding linear model parameters and accordingly generate the first chroma prediction result of the specific chroma block 1110.

Figure 3C:
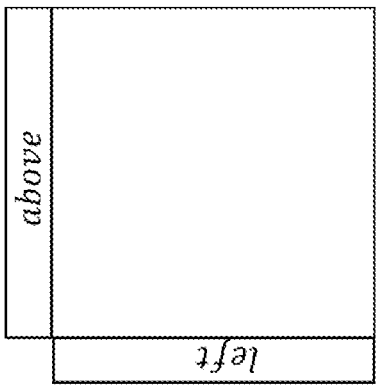
Figure 4:
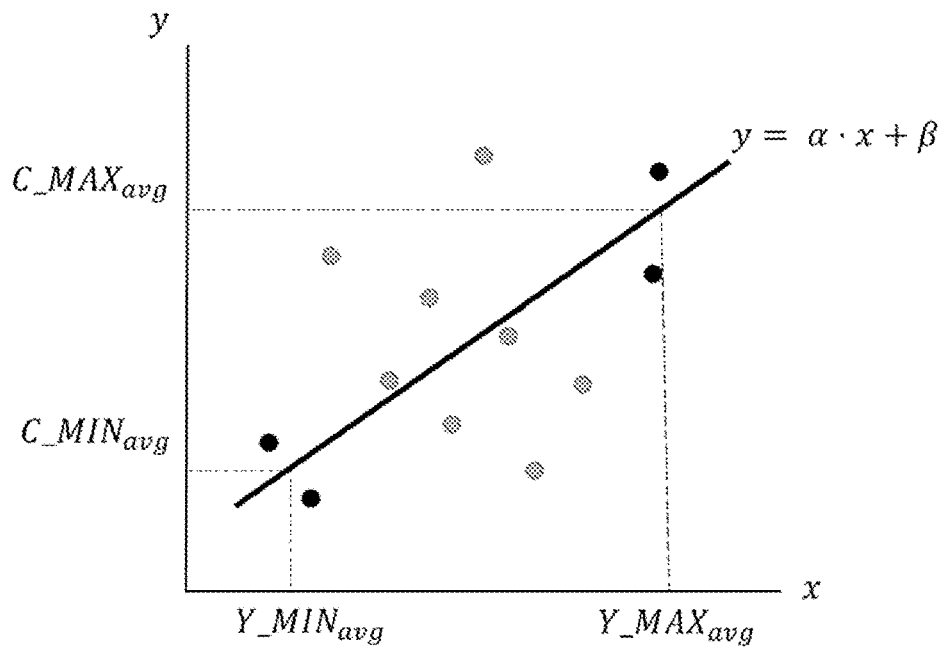
FIG. 4 shows a schematic diagram of the MDLM.
Figure 5:
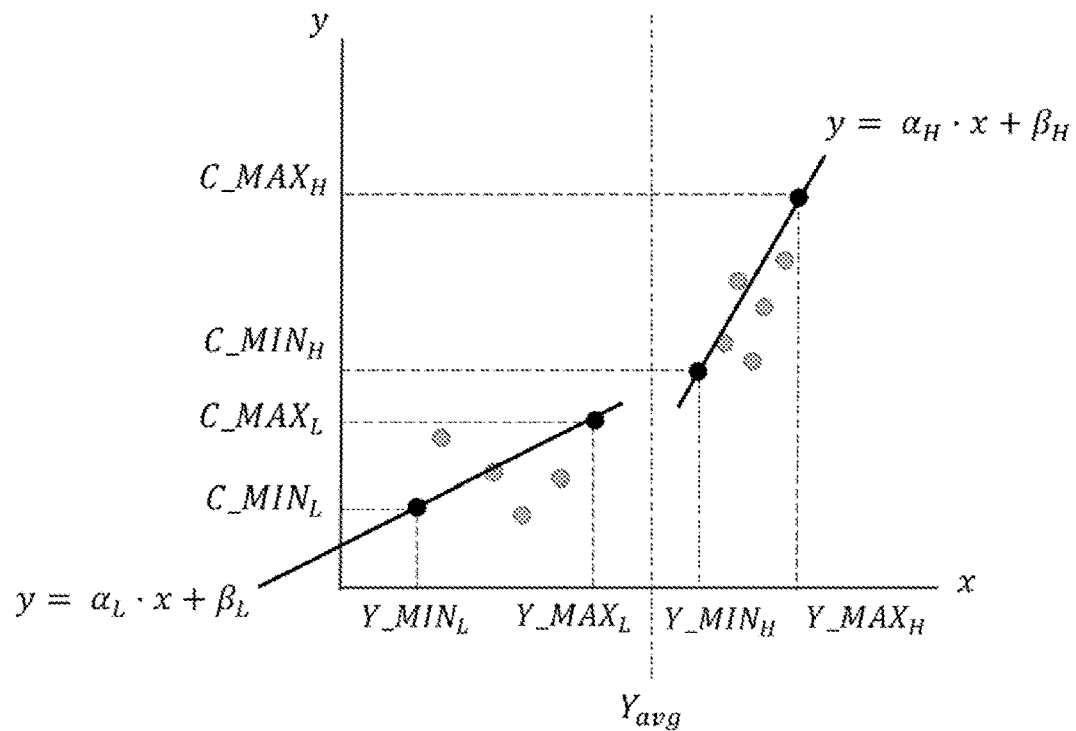
FIG. 5 shows a schematic diagram of the MMLM.
Figure 6:
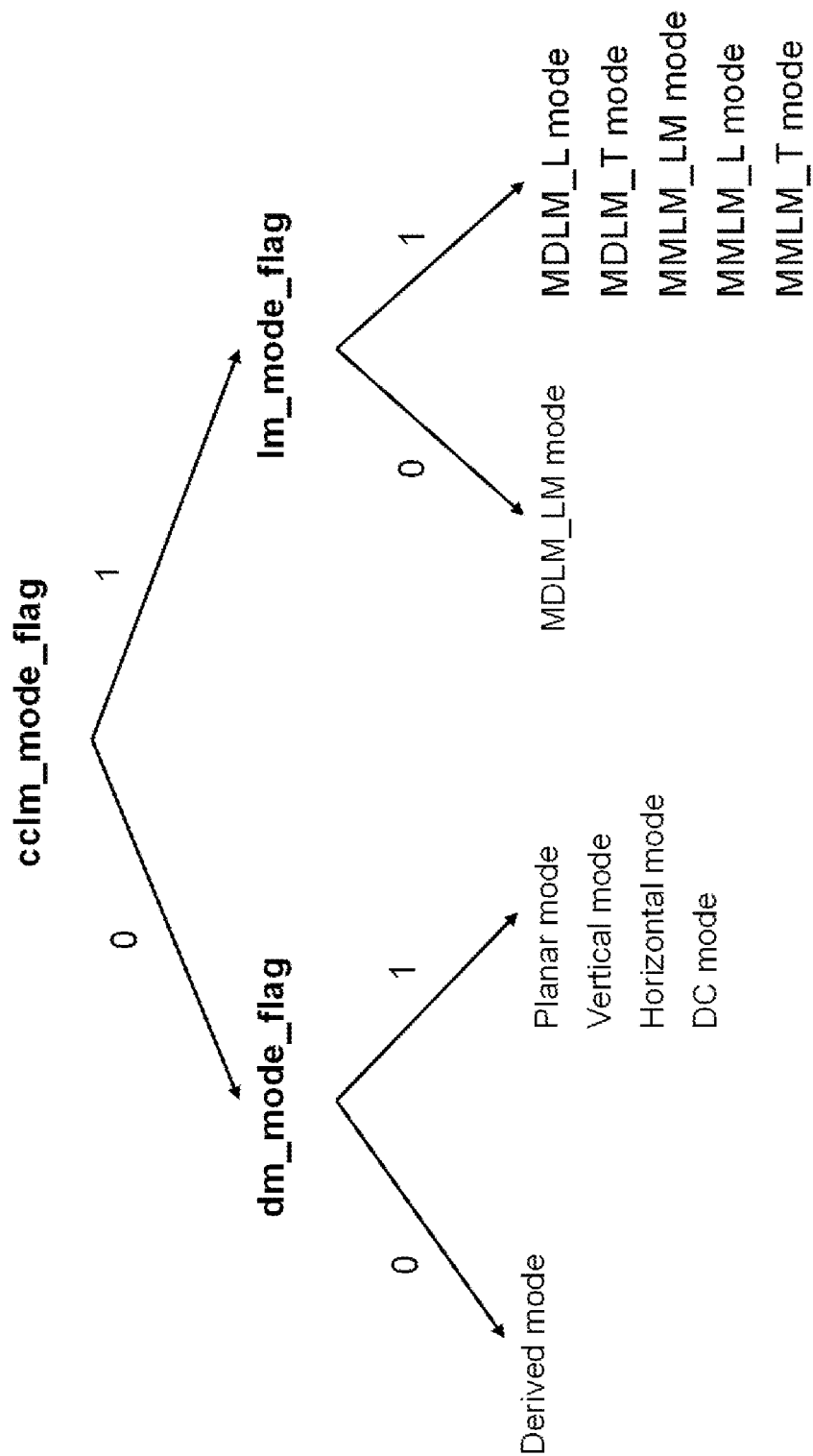
FIG. 6 shows the signaling tree of the chroma intra prediction mode.

For yet another example, if the specific linear model is determined to be MDLM_L mode, the processor 904 may use the corresponding reference sample regions (e.g., the reference sample regions on the left and bottom-left of the specific chroma block 1110) shown in FIG. 3C to determine the corresponding linear model parameters and accordingly generate the first chroma prediction result of the specific chroma block 1110.

Additionally or alternatively, the processor 904 can determine at least one reference region based on the template cost of each of the plurality of the linear models, wherein the at least one reference region can be used to determine the corresponding linear model parameters and accordingly generate the first chroma prediction result of the specific chroma block 1110. For example, if the template cost of the MDLM_L mode is determined to be the lowest among the plurality of linear models, the processor 904 may use the corresponding reference sample regions of the MDLM_L mode (e.g., the reference sample regions on the left and bottom-left of the specific chroma block 1110) as the at least one reference region to determine the corresponding linear model parameters and accordingly generate the first chroma prediction result of the specific chroma block 1110, but the disclosure is not limited thereto.

For another example, if the template cost of the MDLM_T mode is determined to be the lowest among the plurality of linear models, the processor 904 may use the corresponding reference sample regions of the MDLM_T mode (e.g., the reference sample regions on the above and above-right of the specific chroma block 1110) as the at least one reference region to determine the corresponding linear model parameters and accordingly generate the first chroma prediction result of the specific chroma block 1110, but the disclosure is not limited thereto.

Figure 12:
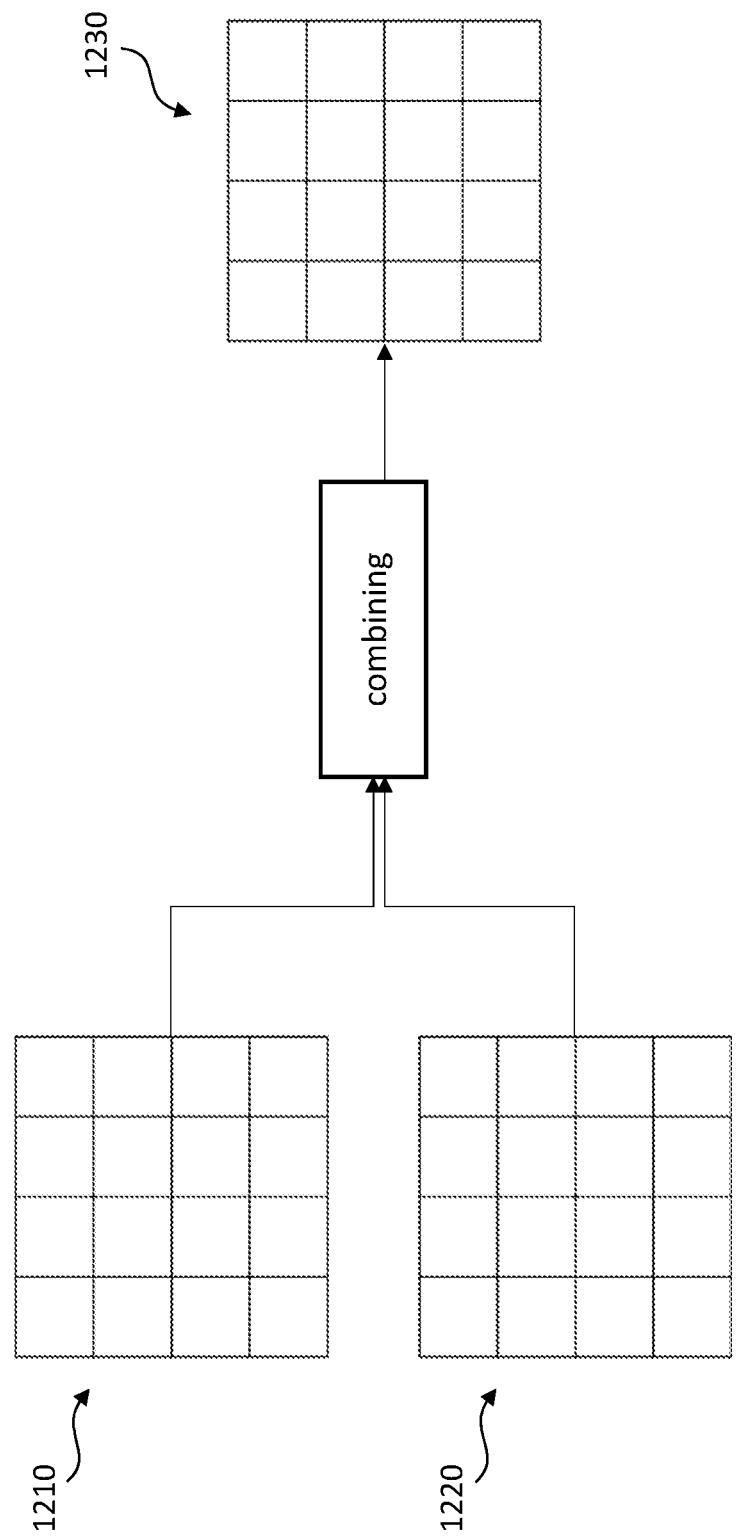
FIG. 12 shows a schematic diagram of determining a specific chroma prediction result according to an embodiment of the disclosure.

See FIG. 12, which shows a schematic diagram of determining a specific chroma prediction result according to an embodiment of the disclosure. In FIG. 12, it is assumed that the specific chroma block 1110 has the first chroma prediction result 1210. In the embodiment, the processor 904 can further select a reference linear model from the plurality of linear models and use the reference linear model to generate a second chroma prediction result 1220 of the specific chroma block 1110. Next, the processor 904 can combine the first chroma prediction result 1210 and the second chroma prediction result 1220 into a specific chroma prediction result 1230 of the specific chroma block 1110, wherein the specific chroma prediction result 1230 of the specific chroma block 1110 can be understood as a modified result with respect to the first chroma prediction result 1210, but the disclosure is not limited thereto.

In the embodiment, how the processor 904 determines the second chroma prediction result 1220 by using the reference linear model can be referred to the procedure of using the specific linear model to determine the first chroma prediction result.

In one embodiment, a prediction mode can be used to generate the second chroma prediction result 1220, and the prediction mode can be determined by default. In some embodiments, the default prediction mode can be Planar mode, derived mode, MDLM_LT mode, or MMLM_LT mode. In some embodiments, the prediction mode can be a CCLM prediction mode, which may be determined based on the corresponding template cost.

In some implementations, the reference linear model may be selected from the considered linear models based on the corresponding template cost. For example, the linear model with second lowest template cost may be selected as the reference linear model.

In one embodiment, the processor 904 may determine the specific chroma prediction result 1230 of the specific chroma block 1110 via performing a weighted linear combination on the first chroma prediction result 1210 and the second chroma prediction result 1220. The weighted linear combination may be characterized as follow:

$$\text{Pred}_{TM\_CHROMA} = w_1 \times \text{Pred}_{LM} + w_2 \times \text{Pred}_{weighted},$$

wherein $\text{Pred}_{TM\_CHROMA}$ may be the specific chroma prediction result 1230. $\text{Pred}_{LM}$ may be the first chroma prediction result 1210, $\text{Pred}_{weighted}$ may be the second chroma prediction result 1220. $w_1$ may be the first weighting value corresponding to the first chroma prediction result 1210 and $w_2$ may be the second weighting value corresponding to the second chroma prediction result 1220. The sum of first weighting value and second weighting value may be equal to one.

In some implementations, the first weighting value and the second weighting value may be set by default. For example, the first weighting value may be equal to 0.5 and the second weighting value may be equal to 0.5.

In some implementations, the first weighting value and the second weighting value may be set based on the template costs corresponding to the specific linear model and the reference linear model. In some implementations, the first weighting value and second weighting value may be set based on a comparison between the template cost of the specific linear model and the template cost of the reference linear model. The template cost of the specific linear model may be referred to as $Cost_{LM}$ hereinafter. The template cost of the reference linear model may be referred to as $Cost_{weighted}$ hereinafter.

In some implementations, the comparison may be performed based on a ratio between $Cost_{LM}$ and $Cost_{weighted}$. For example, the ratio may be equal to $$\frac{Cost_{LM}}{Cost_{weighted}},$$

the first weighting value may be equal to (1−ratio) and the second weighting value may be equal to the ratio.

In some implementations, the first weighting value and the second weighting value may be set based on the comparison between $Cost_{LM}$ and $Cost_{weighted}$. For example, if $Cost_{LM}$ is smaller than $Cost_{weighted}$, then the first weighting value may be equal to ⅔ and the second weighting value may be equal to ⅓. If $Cost_{LM}$ is greater than $Cost_{weighted}$, then the first weighting value may be equal to ⅓ and the second weighting value may be equal to ⅔. If $Cost_{LM}$ is equal to $Cost_{weighted}$, then the first weighting value may be equal to ½ and the second weighting value may be equal to ½.

In some implementations, the weighted linear combination may be applied on a combining flag, which indicates whether to combine the first chroma prediction result 1210 and the second chroma prediction result 1220 into the specific chroma prediction result 1230 of the specific chroma block 1110. For example, if the combining flag is equal to 1, then the weighted linear combination is applied to combine the first chroma prediction result 1210 and the second chroma prediction result 1220 into the specific chroma prediction result 1230. If the combining flag is equal to 0, then the weighted linear combination would not be applied to combine the first chroma prediction result 1210 and the second chroma prediction result 1220 into the specific chroma prediction result 1230. The combining flag may be signaled in CU/Slice header/Picture header/PPS/SPS level, but the disclosure is not limited thereto.

In some implementations, the weighted linear combination may be applied based on a comparison between $Cost_{LM}$ and $Cost_{weighted}$ and a reference factor, which may be characterized by $T \times Cost_{LM}$. For example, if $Cost_{weighted} < T \times Cost_{LM}$, then the weighted linear combination would be applied to combine the first chroma prediction result 1210 and the second chroma prediction result 1220 into the specific chroma prediction result 1230; otherwise, the weighted linear combination would not be applied to combine the first chroma prediction result 1210 and the second chroma prediction result 1220 into the specific chroma prediction result 1230. T may be the threshold value and T may be a positive constant value.

In one embodiment, the specific chroma block 1110 is designed with a specific chroma mode flag (which may be referred to as TM_CHROMA flag), which indicates whether to use the specific linear model as a prediction mode to generate the first chroma prediction result 1210 of the specific chroma block 1110.

In some implementations, if the TM_CHROMA flag equal to 1 specifies the specific chroma block 1110 uses the specific linear model as the prediction mode (which may be referred to as using TM_CHROMA mode). If the TM_CHROMA flag equal to 0, it means that the specific chroma block 1110 does not use the specific linear model as the prediction mode (which may be referred to as not using TM_CHROMA mode).

In some implementations, the TM_CHROMA flag may be signaled first in the signaling tree of the chroma intra prediction mode to save signaling overhead.

In one embodiment, in response to the specific chroma mode flag is determined to be a first value (e.g., 1), the processor 904 may signal the specific chroma mode flag without signalling other chroma mode flags corresponding to the linear models. On the other hand, in response to the specific chroma mode flag is determined to be a second value (e.g., 0), the processor 904 may signal the chroma mode flag and the other chroma mode flags corresponding to the linear models.

Figure 13:
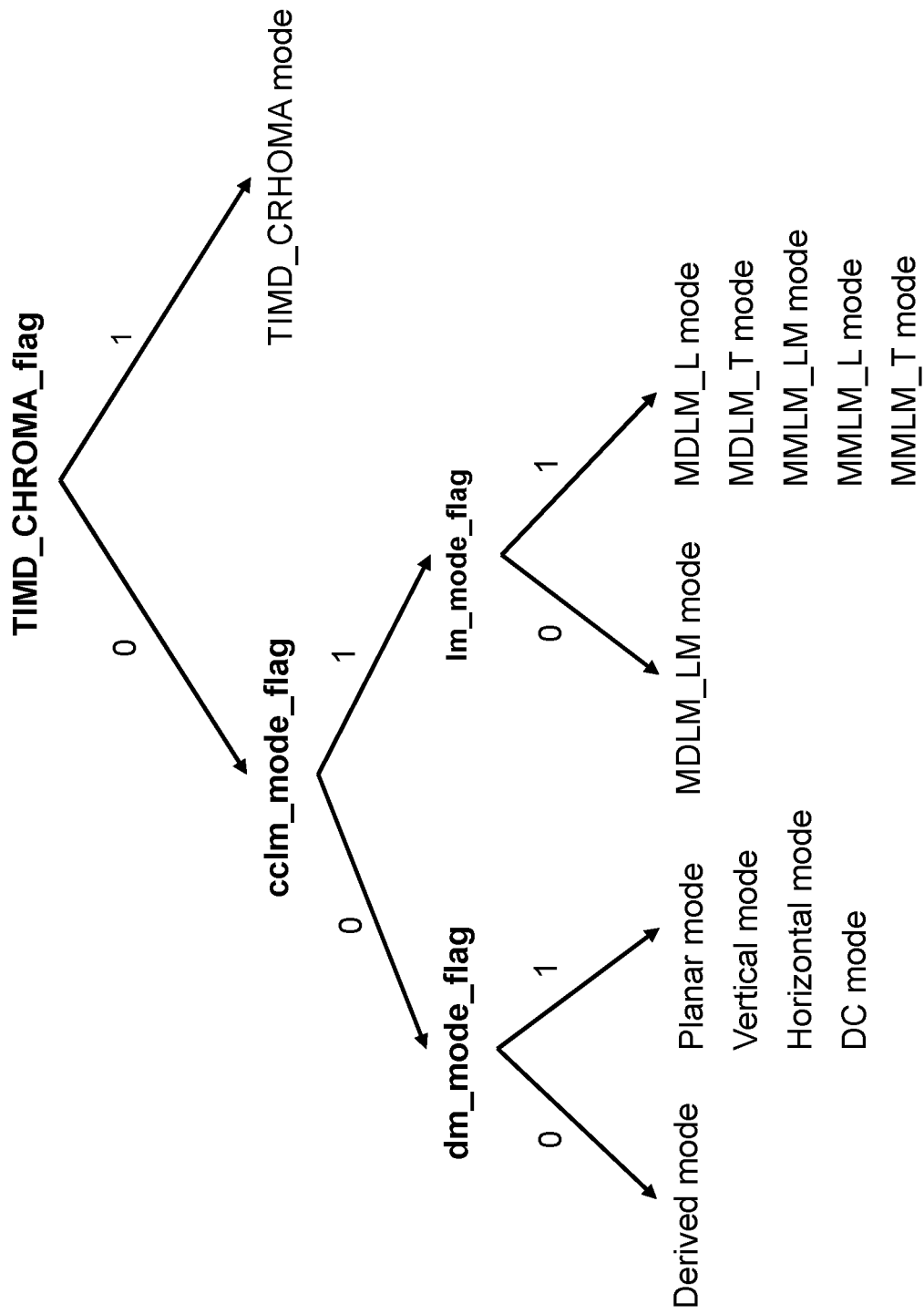
FIG. 13 shows the signaling tree according to an embodiment of the disclosure.

See FIG. 13, which shows the signaling tree according to an embodiment of the disclosure. In FIG. 13, if the specific chroma block 1110 uses TM_CHROMA mode as the prediction mode, then a plurality of chroma mode flags (e.g., the cclm_mode_flag and the below) may not be signaled, which improves the signaling efficiency.

Figure 14:
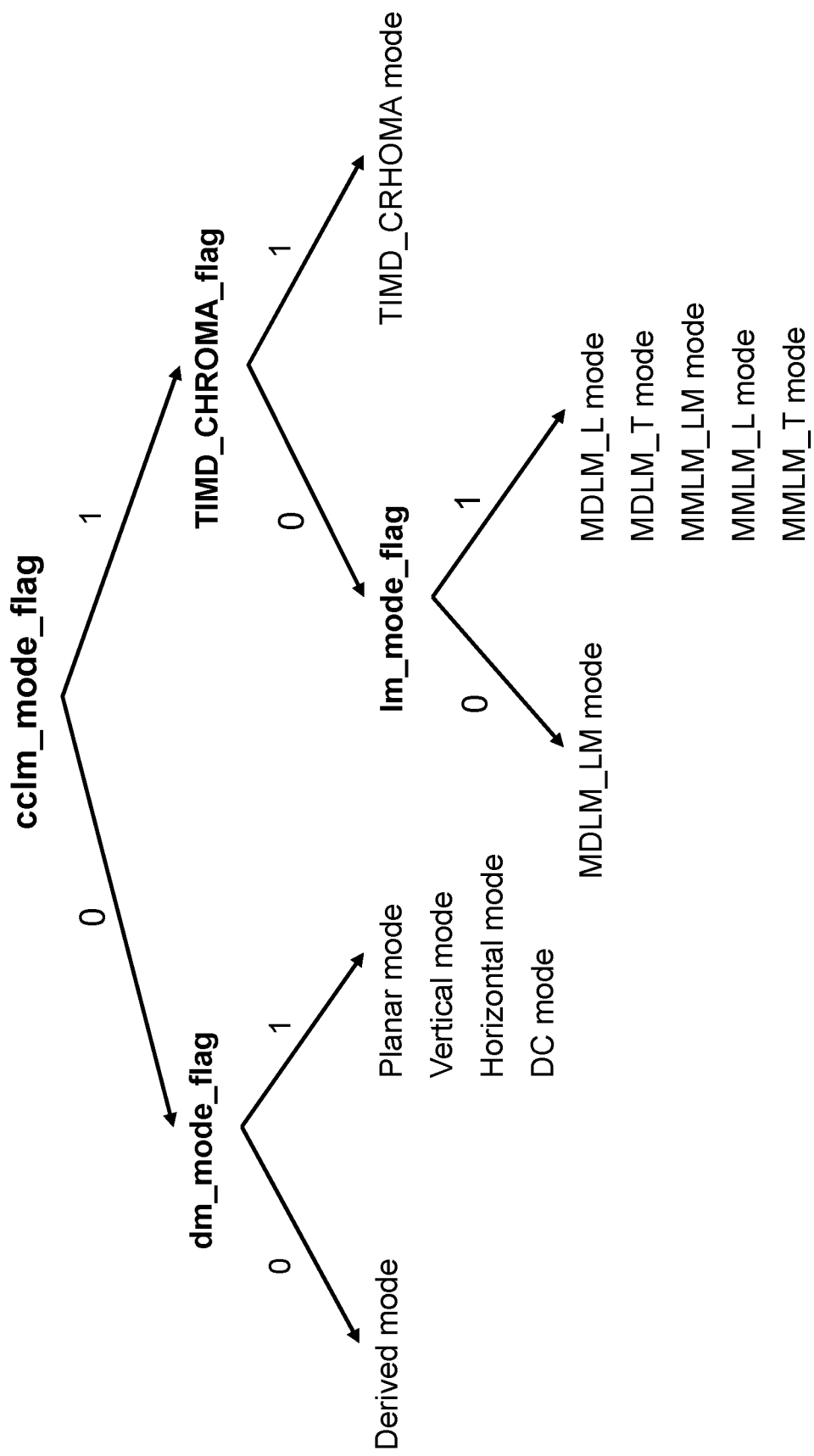
FIG. 14 shows another signaling tree according to an embodiment of the disclosure.

See FIG. 14, which shows another signaling tree according to an embodiment of the disclosure. In FIG. 14, the TM_CHROMA flag may be signaled before the lm_mode_flag in the signaling tree of the chroma intra prediction mode. If the specific chroma block 1110 uses TM_CHROMA mode as the prediction mode, then a plurality of LM mode flags may not be signaled, such as the lm_mode_flag and the below.

In other embodiments, the processor 904 can take a plurality of conventional intra prediction modes into consideration, and the processor 904 may accordingly determine the specific intra prediction mode used for generating the first chroma prediction result 1210 of the specific chroma block 1110.

The conventional intra prediction modes may include a plurality of non-angular modes and a plurality of angular modes. The non-angular mode may be one of Planar mode, DC mode and Derived mode. The angular mode may be one of 65 directional intra prediction modes.

In some implementations, the conventional intra prediction modes may include Planar mode, Vertical mode, Horizontal mode, Diagonal mode, Derived mode and DC mode.

In some implementations, the conventional intra prediction modes may include a plurality of intra prediction modes in a Most probable mode (MPM) list. The MPM list may be derived from the luma block 1120 corresponding to the specific chroma block 1110. The intra prediction modes in the MPM list may be derived from a plurality of neighbouring intra prediction modes.

Figure 15:
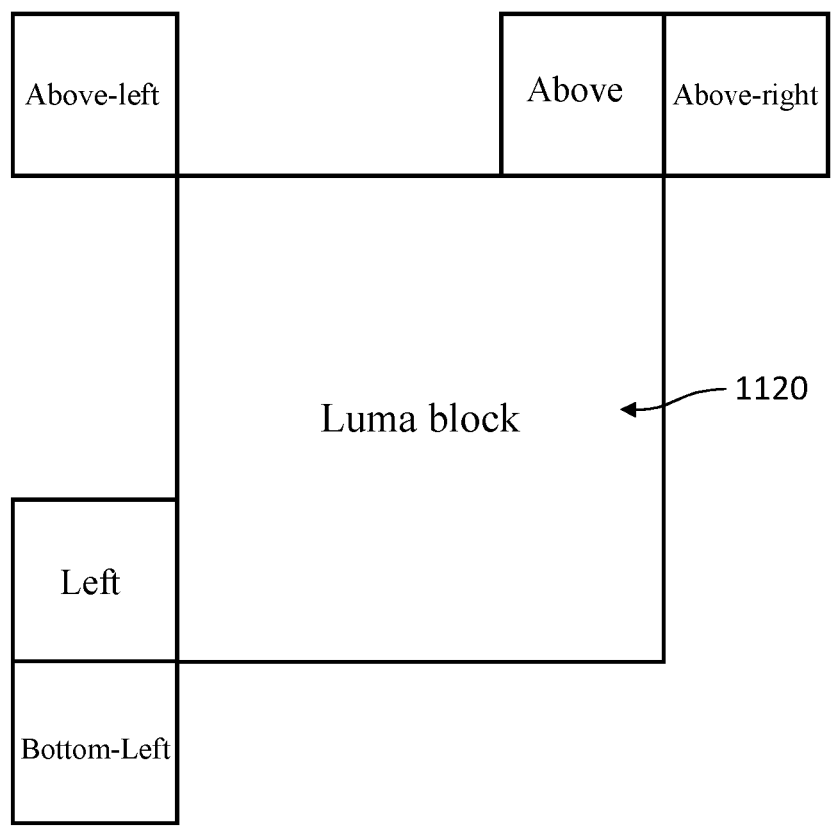
FIG. 15 shows a schematic diagram of the plurality of neighbouring intra prediction modes according to an embodiment of the disclosure.

See FIG. 15, which shows a schematic diagram of the plurality of neighbouring intra prediction modes according to an embodiment of the disclosure. The plurality of neighbouring intra prediction modes may be the intra prediction modes of the neighbouring blocks as shown in FIG. 15, but the disclosure is not limited thereto.

In the embodiments of the disclosure, the processor 904 can also determine the template cost corresponding each of the conventional intra prediction modes, and the details may be referred to the descriptions associated with steps S1020 to S1040.

With the template cost corresponding each of the conventional intra prediction modes, the processor 904 can accordingly determine the specific intra prediction mode, and the procedure thereof can be referred to the descriptions associated with step S1050.

In one embodiment, the processor 904 can use the specific intra prediction mode to generate the first chroma prediction result 1210 of the specific chroma block 1110.

In one embodiment, the processor 904 can further select a reference intra prediction mode from the considered conventional intra prediction modes and accordingly generate the second chroma prediction result 1220 of the specific chroma block 1110.

In one embodiment, the reference intra prediction mode can be determined by default. For example, the default reference intra prediction mode can be the Planar mode, Derived mode, MDLM_LT mode, MMLM_LT mode, etc, and the default reference intra prediction mode can be chosen based on the corresponding template cost.

In one embodiment, the processor 904 can determine whether to perform the weighted linear combination on the first chroma prediction result 1210 and the second chroma prediction result 1220, and the details can be referred to the above embodiments.

In one embodiment, the processor 904 can comprehensively consider the linear models and the conventional intra prediction modes, and accordingly select a specific model for generating the first chroma prediction result 1210 therefrom based on the corresponding template cost of each of the linear models and the conventional intra prediction modes.

For example, the specific model may be the model with the lowest template cost among the linear models and the conventional intra prediction modes, but the disclosure is not limited thereto.

In addition, the procedure of performing the weighted linear combination can be also applied after determining the specific model, and the details can be referred to the embodiments in the above.

To sum up, the embodiments of the disclosure propose a solution to determine the corresponding to the template cost of each of the considered linear models (and/or the considered conventional intra prediction modes) and accordingly determine the specific linear model (e.g., the model with the lowest template cost) for generating the chroma prediction result of the specific chroma block, wherein the specific linear model may be highly possible to be the linear model capable of providing the most accurate chroma prediction result.

In addition, with the specific chroma mode flag, the signalling efficiency can be improved since the flags associated with other modes (e.g., cclm_mode_flag in FIG. 13 and the below) do not need to be signalled in the case where the specific chroma mode flag is the first value (e.g., 1).

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method performed by a video decoding device for predicting and reconstructing a chroma block using a specific linear model, the method comprising:

receiving a bitstream;
determining a plurality of linear model parameters of each of a plurality of linear models;
determining locations of the chroma block and a luma block, that corresponds to the chroma block, from a video frame retrieved from the bitstream;
determining a first template region neighboring the chroma block and a second template region neighboring the luma block, wherein the first template region is reconstructed as a chroma template reconstruction and the second template region is reconstructed as a luma template reconstruction;
determining a chroma template prediction of the first template region for each of the plurality of linear models based on the luma template reconstruction and the plurality of linear model parameters of each linear model;
determining a template cost for each of the plurality of linear models based on a difference between the chroma template reconstruction and a corresponding chroma template prediction;
selecting the specific linear model from the plurality of linear models for predicting the chroma block based on the template cost of each of the plurality of linear models;
using the specific linear model to generate a first chroma prediction result of the chroma block;
determining, based on the bitstream, a chroma residual block corresponding to the chroma block; and
reconstructing the chroma block based on the first chroma prediction result and the chroma residual block.

2. The method according to claim 1, wherein determining the first template region neighboring the chroma block comprises:

determining at least one neighbouring chroma region of the chroma block as the first template region, each of the at least one neighbouring chroma region comprising a plurality of reconstructed chroma samples.

3. The method according to claim 2, wherein the at least one neighbouring chroma region of the chroma block comprises at least one of a first chroma region above the chroma block and a second chroma region on the left side of the chroma block.

4. The method according to claim 1, wherein determining the second template region neighboring the luma block comprises:

determining at least one neighbouring luma region of the luma block, each of the at least one neighbouring luma region comprising a plurality of luma samples;
downsampling the at least one neighbouring luma region and the luma block to obtain a downsampled luma block and at least one downsampled neighbouring luma region of the downsampled luma block;
determining the at least one downsampled neighbouring luma region as the second template region corresponding to the luma block.

5. The method according to claim 4, wherein downsampling the at least one neighbouring luma region and the luma block comprises:

downsampling the at least one neighbouring luma region and the luma block by using a downsample filter, wherein the downsample filter is determined based on a video format of a video frame corresponding to the chroma block.

6. The method according to claim 4, wherein the at least one downsampled neighbouring luma region of the downsampled luma block comprises at least one of a first luma region above the downsampled luma block and a second luma region on the left side of the downsampled luma block.

7. The method according to claim 1, wherein the plurality of linear models comprises a first linear model, and determining the chroma template prediction of the first template region for each of the plurality of linear models based on the luma template reconstruction and the plurality of linear model parameters of each linear model comprises:
determining a first linear function based on the plurality of linear model parameters of the first linear model;
determining the chroma template prediction corresponding to the first linear model by using the first linear function to process the luma template reconstruction,
wherein the plurality of linear model parameters of the first linear model is characterised by $\alpha$ and $\beta$, and a sample in position (i, j) of the chroma template prediction $Pred_{template}(i, j)$ corresponding to the first linear model is characterised by:

$$Pred_{template}(i,j)=\alpha \times rec'_L(i,j)+\beta$$

wherein $rec'_L(i, j)$ is a luma sample in position (i, j) of the luma template reconstruction.

8. The method according to claim 1, wherein the plurality of linear model parameters of each of the plurality of linear models is generated based on a plurality of reference sample regions.

9. The method according to claim 8, wherein the plurality of reference sample regions is different from each other and the plurality of reference sample regions comprises at least one neighbouring region of the chroma block.

10. The method according to claim 1, wherein the plurality of linear models comprises a first linear model, and determining the template cost for each of the plurality of linear models based on the difference between the chroma template reconstruction and the corresponding chroma template prediction comprises:
determining a first difference between the chroma template reconstruction and the chroma template prediction corresponding to the first linear model as the template cost of the first linear model.

11. The method according to claim 1, wherein the specific linear model has a lowest template cost among the plurality of linear models.

12. The method according to claim 1, further comprising:
selecting a reference linear model from the plurality of linear models and using the reference linear model to generate a second chroma prediction result of the chroma block; and
combining the first chroma prediction result and the second chroma prediction result into a specific chroma prediction result of the chroma block.

13. The method according to claim 12, wherein the chroma block is designed with a combining flag, which indicates whether to combine the first chroma prediction result and the second chroma prediction result into the specific chroma prediction result of the chroma block.

14. The method according to claim 12, wherein combining the first chroma prediction result and the second chroma prediction result into the specific chroma prediction result of the chroma block comprises:
determining the specific chroma prediction result of the chroma block via performing a weighted linear combination on the first chroma prediction result and the second chroma prediction result.

15. The method according to claim 14, wherein weightings corresponding to the first chroma prediction result and the second chroma prediction result are determined based on the template costs of the specific linear model and the reference linear model, respectively.

16. The method according to claim 1, further comprising:
determining, from the bitstream, a specific chroma mode flag associated with the chroma block,
wherein the specific chroma mode flag indicates whether to use the specific linear model as a prediction mode to generate the first chroma prediction result of the chroma block.

17. The method according to claim 16, further comprising:
in response to the specific chroma mode flag being determined to have a first value, forgo decoding other chroma mode flags corresponding to the plurality of linear models; and
in response to the specific chroma mode flag being determined to have a second value, decoding the other chroma mode flags corresponding to the plurality of linear models.

18. The method according to claim 1, wherein the video frame comprises a chroma component having the chroma block.

19. A video decoding device, comprising:
a non-transitory computer-readable medium storing one or more computer executable instructions; and
a processor coupled to the non-transitory computer-readable medium and configured to execute the one or more computer-executable instructions to:
receive a bitstream;
determine a plurality of linear model parameters of each of a plurality of linear models;
determine locations of a chroma block and a luma block, that corresponds to the chroma block from a video frame retrieved from the bitstream;
determine a first template region neighboring the chroma block and a second template region neighboring the luma block, wherein the first template region is reconstructed as a chroma template reconstruction and the second template region is reconstructed as a luma template reconstruction;
determine a chroma template prediction of the first template region for each of the plurality of linear models based on the luma template reconstruction and the plurality of linear model parameters of each linear model;
determine a template cost for each of the plurality of linear models based on a difference between the chroma template reconstruction and a corresponding chroma template prediction;
select a specific linear model from the plurality of linear models for predicting the chroma block based on the template cost of each of the plurality of linear models;
use the specific linear model to generate a first chroma prediction result of the chroma block;
determine, based on the bitstream, a chroma residual block corresponding to the chroma block; and
reconstruct the chroma block based on the first chroma prediction result and the chroma residual block.

* * * * *